United States Patent
Schubert et al.

(10) Patent No.: US 10,353,388 B2
(45) Date of Patent: Jul. 16, 2019

(54) DROP-OFF LOCATION PLANNING FOR DELIVERY VEHICLE

(71) Applicant: X Development LLC, Mountain View, CA (US)

(72) Inventors: Martin Schubert, Mountain view, CA (US); Michael Grundmann, San Jose, CA (US); Clifford Biffle, Redwood City, CA (US); Philip Watson, Mountain View, CA (US)

(73) Assignee: X Development LLC, Mountain Veiw, CA (US)

( * ) Notice: Subject to any disclaimer, the term of this patent is extended or adjusted under 35 U.S.C. 154(b) by 236 days.

(21) Appl. No.: 15/295,995

(22) Filed: Oct. 17, 2016

(65) Prior Publication Data
US 2018/0107211 A1 Apr. 19, 2018

(51) Int. Cl.
G05D 1/04 (2006.01)
G05D 1/00 (2006.01)
(Continued)

(52) U.S. Cl.
CPC ......... *G05D 1/0044* (2013.01); *B64C 39/024* (2013.01); *G01C 21/005* (2013.01);
(Continued)

(58) Field of Classification Search
CPC ........ B64C 2201/128; B64C 2201/146; B64C 39/024; G01C 21/005; G01C 21/20;
(Continued)

(56) References Cited

U.S. PATENT DOCUMENTS

| 7,657,466 B2 | 2/2010 | Klingenberg et al. |
| 8,743,244 B2 | 6/2014 | Vartanian et al. |

(Continued)

FOREIGN PATENT DOCUMENTS

EP 2996009 3/2016

OTHER PUBLICATIONS

Laura Wenus, Self Propelling Delivery Robots Testing in the Mission, Mission Local, Feb. 21, 2017.
(Continued)

*Primary Examiner* — Angelina Shudy
(74) *Attorney, Agent, or Firm* — Fish & Richardson P.C.

(57) ABSTRACT

An example method may include receiving, from a client computing device, an indication of a target drop-off spot for an object within a first virtual model of a first region of a delivery destination. A second virtual model of a second region of the delivery destination may be determined based on sensor data received from one or more sensors on a delivery vehicle. A mapping may be determined between physical features represented in the first virtual model and physical features represented in the second virtual model to determine an overlapping region between the first and second virtual models. A position of the target drop-off spot within the second virtual model may be determined based on the overlapping region. Based on the position of the target drop-off spot within the second virtual model, the delivery vehicle may be navigated to the target drop-off spot to drop off the object.

20 Claims, 14 Drawing Sheets

(51) Int. Cl.

| | |
|---|---|
| *G05D 1/10* | (2006.01) |
| *G06N 7/00* | (2006.01) |
| *B64C 39/02* | (2006.01) |
| *G01C 21/00* | (2006.01) |
| *G05D 1/06* | (2006.01) |
| *G08G 5/00* | (2006.01) |
| *G08G 5/02* | (2006.01) |
| *G01C 21/20* | (2006.01) |

(52) U.S. Cl.
CPC ........... *G01C 21/20* (2013.01); *G05D 1/0676* (2013.01); *G05D 1/101* (2013.01); *G06N 7/005* (2013.01); *G08G 5/0013* (2013.01); *G08G 5/0021* (2013.01); *G08G 5/0026* (2013.01); *G08G 5/0069* (2013.01); *G08G 5/025* (2013.01); *B64C 2201/128* (2013.01); *B64C 2201/146* (2013.01)

(58) Field of Classification Search
CPC .... G05D 1/0044; G05D 1/0676; G05D 1/101; G06N 7/005; G06T 7/75; G08G 5/02; G08G 5/0013; G08G 5/0021; G08G 5/0026; G08G 5/0069; G08G 5/025
USPC ........................................ 701/3, 4, 23, 425
See application file for complete search history.

(56) References Cited

U.S. PATENT DOCUMENTS

| | | | |
|---|---|---|---|
| 9,096,354 | B2 | 8/2015 | Baudson et al. |
| 9,121,669 | B1* | 9/2015 | Hyslop ................. F41G 7/2206 |
| 9,174,733 | B1* | 11/2015 | Burgess ................... B64D 1/12 |
| 9,177,481 | B2 | 11/2015 | Wang et al. |
| 9,244,147 | B1* | 1/2016 | Soundararajan .......... G01S 1/44 |
| 9,321,531 | B1* | 4/2016 | Takayama ................ B64D 1/12 |
| 9,336,506 | B2* | 5/2016 | Shucker .............. G06Q 10/083 |
| 9,359,074 | B2* | 6/2016 | Ganesh ................ G08G 5/0069 |
| 9,459,620 | B1 | 10/2016 | Schaffalitzky |
| 9,488,979 | B1 | 11/2016 | Chambers et al. |
| 9,580,173 | B1* | 2/2017 | Burgess ................ B64C 39/024 |
| 9,817,396 | B1* | 11/2017 | Takayama ............ G05D 1/0038 |
| 9,818,304 | B2* | 11/2017 | Modica ................ G05D 1/0676 |
| 9,849,981 | B1* | 12/2017 | Burgess ................... B64D 1/12 |
| 9,852,392 | B2* | 12/2017 | Srinivasan ....... G06Q 10/08355 |
| 9,911,226 | B2* | 3/2018 | Hillen ..................... G06T 17/00 |
| 9,940,840 | B1* | 4/2018 | Schubert .................. G08G 1/22 |
| 9,947,228 | B1* | 4/2018 | Kim ........................ G08G 1/167 |
| 10,023,311 | B2* | 7/2018 | Lai ........................... B64D 1/18 |
| 10,120,384 | B2* | 11/2018 | Wilkinson ............... G06K 9/00 |
| 2003/0112235 | A1* | 6/2003 | Grace ..................... G06T 17/20 345/419 |
| 2005/0084975 | A1 | 4/2005 | Armentrout |
| 2006/0112034 | A1 | 5/2006 | Okamoto et al. |
| 2007/0198159 | A1 | 8/2007 | Durkos et al. |
| 2008/0071431 | A1 | 3/2008 | Dockter et al. |
| 2010/0084513 | A1* | 4/2010 | Gariepy ................ B64C 39/024 244/190 |
| 2010/0286859 | A1* | 11/2010 | Feigh ................... G05D 1/0044 701/25 |
| 2012/0030133 | A1 | 2/2012 | Rademaker |
| 2012/0136895 | A1 | 5/2012 | Johnson |
| 2012/0232718 | A1* | 9/2012 | Rischmuller .......... A63H 27/12 701/2 |
| 2012/0314032 | A1 | 12/2012 | Muensterer et al. |
| 2013/0141540 | A1* | 6/2013 | Persson ................ G06K 9/0063 348/46 |
| 2013/0275164 | A1* | 10/2013 | Gruber ................... G10L 17/22 705/5 |
| 2013/0282208 | A1 | 10/2013 | Mendez-Rodriguez et al. |
| 2014/0032034 | A1 | 1/2014 | Raptopoulos et al. |
| 2014/0180914 | A1* | 6/2014 | Abhyanker .............. G01C 1/00 705/39 |
| 2014/0180959 | A1 | 6/2014 | Gillen et al. |
| 2014/0330456 | A1* | 11/2014 | Lopez Morales ........................... G06Q 10/08355 701/3 |
| 2015/0120094 | A1* | 4/2015 | Kimchi ................. B64C 39/024 701/3 |
| 2015/0120598 | A1* | 4/2015 | Fadell ................... G06Q 10/083 705/333 |
| 2015/0145643 | A1* | 5/2015 | Fadell ................... G06Q 10/083 340/5.51 |
| 2015/0154559 | A1 | 6/2015 | Barbush et al. |
| 2015/0156031 | A1* | 6/2015 | Fadell ................... H04L 12/2816 700/276 |
| 2015/0158599 | A1 | 6/2015 | Sisko |
| 2015/0248640 | A1 | 9/2015 | Srinivasan |
| 2016/0004252 | A1* | 1/2016 | Nagasawa ........ G05B 19/41895 701/26 |
| 2016/0027207 | A1 | 1/2016 | Hillen et al. |
| 2016/0033966 | A1 | 2/2016 | Farris et al. |
| 2016/0068264 | A1* | 3/2016 | Ganesh ................ G08G 5/0069 701/2 |
| 2016/0107750 | A1 | 4/2016 | Yates |
| 2016/0179096 | A1 | 6/2016 | Bradlow et al. |
| 2017/0124883 | A1* | 5/2017 | Modica ................ G05D 1/0676 |
| 2017/0219676 | A1* | 8/2017 | Tran ....................... H04W 12/02 |
| 2017/0259920 | A1* | 9/2017 | Lai ........................... B64D 1/18 |
| 2017/0364090 | A1* | 12/2017 | Grufman ............... G05D 1/0214 |
| 2018/0005180 | A1* | 1/2018 | Jalaldeen ........... G06Q 10/0832 |
| 2018/0069650 | A1* | 3/2018 | Tran ........................... G01S 1/68 |
| 2018/0089622 | A1* | 3/2018 | Burch, V ............... G06K 7/1413 |
| 2018/0174102 | A1* | 6/2018 | Winkle .............. B64D 11/0624 |
| 2018/0239350 | A1* | 8/2018 | Cantrell ............... G05D 1/0038 |
| 2018/0356823 | A1* | 12/2018 | Cooper .................. G01C 21/00 |
| 2018/0364741 | A1* | 12/2018 | Van Voorst .......... G08G 5/0069 |
| 2018/0373269 | A1* | 12/2018 | Cantrell ................. G05D 1/101 |
| 2019/0031346 | A1* | 1/2019 | Yong ..................... A01M 7/0042 |
| 2019/0041219 | A1* | 2/2019 | Schubert ............. G01C 21/165 |

OTHER PUBLICATIONS

International Search Report and Written Opinion issued in International Application No. PCT/US2017/051998, dated Dec. 7, 2017, 14 pages.
Jing Huang et al., Point Cloud Matching based on 3D Self-Similarity, 2012 IEEE Computer Society Conference on Computer Vision and Pattern Recognition Workshops, Jun. 16-21, 2012, IEEE.
Radu Bogdan Rusu et al., Aligning Point Cloud Views using Persistent Feature Histograms, 2008 IEEE/RSJ International Conference on Intelligent Robots and Systems, Sep. 22-26, 2008, IEEE.
Vit Goncharuk, Markerless Drone Delivery is Indeed Possible, http://augmentedpixels.com/markerless-drone-delivery/, Dec. 2, 2105.
Indoor Navigation Platform, Augmented Pixels, http://www.slideshare.net/augmentedpixels/indoor-navigation-platform, Sep. 8, 2015.
Andrea Cesetti et al., A Vision-Based Guidance System for UAV Navigation and Safe Landing Using Natural Landmarks, Journal of Intelligent and Robotic Systems, Jan. 2010, pp. 233-257, 57(1).
Ayanna Howard et al., Multi-Sensor Terrain Classification for Safe Spacecraft Landing, IEEE Transaction on Aerospace and Electronic Systems, Oct. 2004, vol. 40, Issue 4, pp. 1112-1131.
Niavid Serrano et al., Landing Site Selection using Fuzzy Rule-Based Reasoning, Proceedings 2007 IEEE International Conference on Robotics and Automation, Apr. 10-14, 2007, IEEE.
Colin Theodore et al., Flight Trials of a Rotorcraft Unmanned Aerial Vehicle Landing Autonomously at Unprepared Sites, American Helicopter Society 62nd Annual Forum, Phoenix, AZ, May 9-11, 2006.
Connor A Theilmann, Integrating Autonomous Drones into the National Aerospace System, Senior Capstone Thesis, University of Pennsylvania School of Engineering and Applied Science, Department of Computer and Information Science, Apr. 29, 2015.
Sven Lange et al., Autonomous Landing for a Multirotor UAV Using Vision, Workshop Proceedings of SI MPAR 2008 International Conference of Simulation, Modeling, and Programming for Autonomous Robots, Nov. 2008, pp. 482-491.

(56) References Cited

OTHER PUBLICATIONS

Stephen M. Chaves et al., NEEC Research: Toward GPS-denied Landing of Unmanned Aerial Vehicles on Ships at Sea, Naval Engineers Journal, 2015, vol. 127, Issue 1, pp. 23-35.
Weiwei Kong et al., Autonomous Landing of an UAV with a Ground-Based Actuated Infrared Stereo Vision System, 2013 IEEE/RSJ International Conference on Intelligent Robots and Systems, Nov. 3-7, 2013.
Pal Moen Most, Visual Navigation of an autonomous drone, Master of Science in Informatics thesis at Norwegian University of Science and Technology Department of Computer and Information Science, Feb. 1, 2014.
Fabrizio Lamberti et al., Mixed Marker-Based/Marker-Less Visual Odometry System for Mobile Robots, International Journal of Advanced Robotic Systems, vol. 10, 2013.
Miguel A Olivares-Mendez et al., Fuzzy Controller for UAV-landing task using 3D-position Visual Estimation, 2010 IEEE International Conference on Fuzzy Systems (FUZZ), Jul. 18-23, 2010.
Abder Larranaga-Cepeda et al., On-line dense point cloud generation from monocular images with scale estimation, 13th Mexican International Conference on Artificial Intelligence, MICAI 2014, Tuxtla Gutierrez, Mexico, Nov. 16-22, 2014. Proceedings, Part I.

* cited by examiner

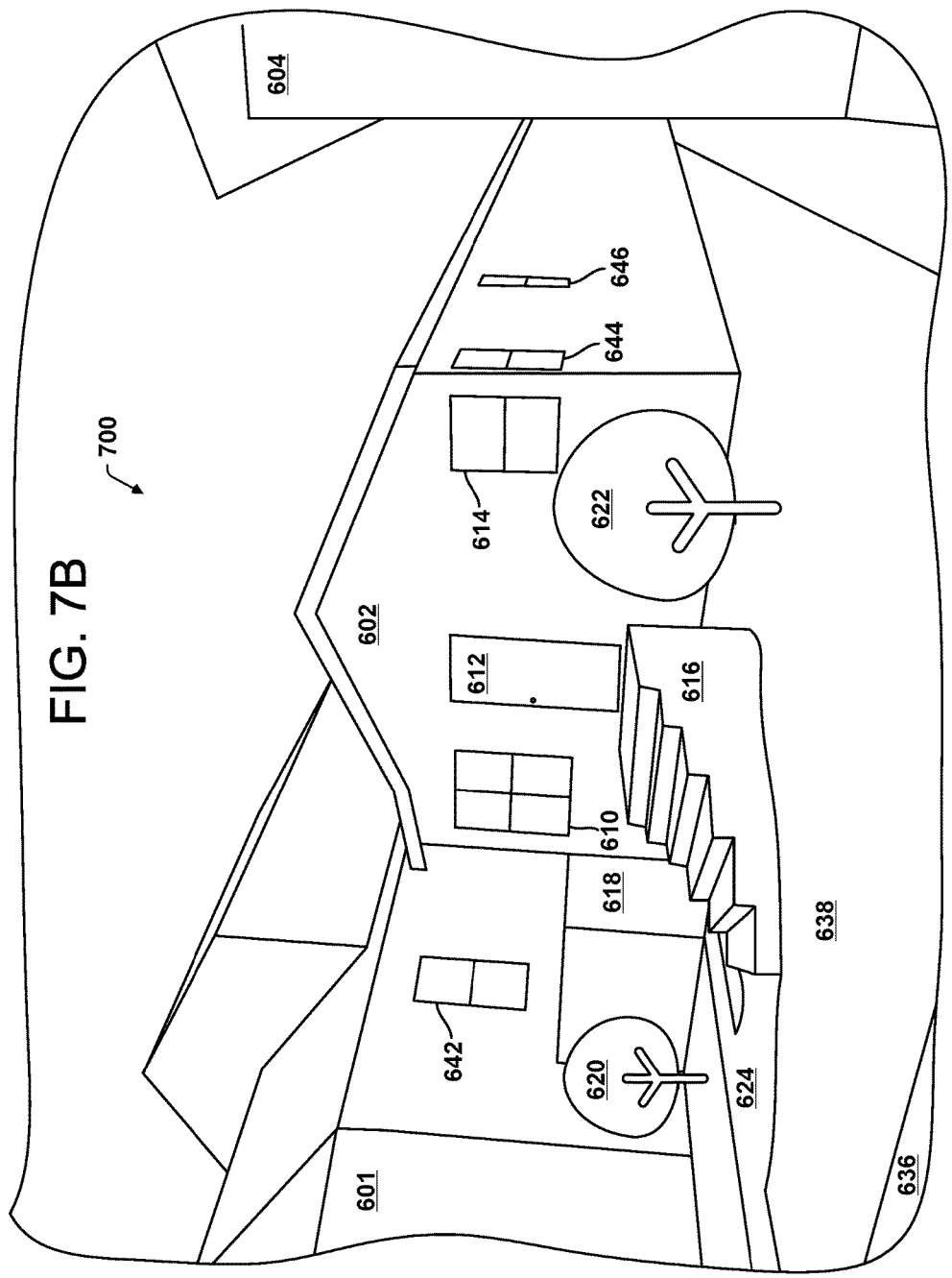

DROP-OFF LOCATION PLANNING FOR DELIVERY VEHICLE

BACKGROUND

An unmanned vehicle, which may also be referred to as an autonomous vehicle, is a vehicle capable of travel without a physically-present human operator. An unmanned vehicle may operate in a remote-control mode, in an autonomous mode, or in a partially autonomous mode.

When an unmanned vehicle operates in a remote-control mode, a pilot or driver that is at a remote location can control the unmanned vehicle via commands that are sent to the unmanned vehicle via a wireless link. When the unmanned vehicle operates in autonomous mode, the unmanned vehicle typically moves based on pre-programmed navigation waypoints, dynamic automation systems, or a combination thereof. Further, some unmanned vehicles can operate in both a remote-control mode and an autonomous mode, and in some instances may do so concurrently. For instance, a remote pilot or driver may wish to leave navigation to an autonomous system while manually performing another task, such as operating a mechanical system for picking up or dropping off objects, as an example.

Various types of unmanned vehicles exist for different environments. For instance, unmanned vehicles exist for operation in the air, on the ground, underwater, and in space. Examples include quad-copters and tail-sitter UAVs, among others. Unmanned vehicles also exist for hybrid operations in which multi-environment operation is possible. Examples of hybrid unmanned vehicles include an amphibious craft that is capable of operation on land as well as on water or a floatplane that is capable of landing on water as well as on land. Other examples are possible.

SUMMARY

Example embodiments include systems and operations for delivery of objects (e.g., packages) to a target drop-off spot within a delivery destination. A client computing device (e.g., phone, tablet, or other computing device equipped with or connectable to sensors) may be used to collect sensor data representing a first region of the delivery destination. A first virtual model may be constructed from the sensor data and the client computing device may be used to designate the target drop-off spot within the delivery destination by placing a target marker in the first virtual model. In response to a request for package delivery, an unmanned delivery vehicle may be dispatched with the package to the delivery destination. Upon arriving at the general vicinity of the delivery destination, the delivery vehicle may begin collecting sensor data to locate the target drop-off spot within the delivery destination. In particular, a second virtual model of a second region of the delivery destination may be generated from the sensor data of the delivery vehicle. A mapping may be determined between physical features represented in the first and second virtual models to determine an overlapping region between the first and second virtual models. The overlapping region may be used to align the first model with the second model and thus determine a position of the target drop-off spot within the second virtual model, as perceived by the delivery vehicle. Accordingly, the delivery vehicle may then be navigated to the target drop-off spot to place the package at the target drop-off spot.

In one example, a method is provided that includes receiving, from a client computing device, an indication of a target drop-off spot for an object within a first virtual model of a first region of a delivery destination. The first virtual model represents first physical features of the first region of the delivery destination. The method also includes receiving, from one or more sensors on a delivery vehicle, sensor data indicative of a second region of the delivery destination. The method additionally includes determining, based on the sensor data, a second virtual model of the second region of the delivery destination. The second virtual model represents second physical features of the second region on the delivery destination. The method further includes determining a mapping between one or more of the first physical features and one or more of the second physical features to determine an overlapping region between the first virtual model and the second virtual model. The method yet further includes determining, based on the overlapping region, a position of the target drop-off spot within the second virtual model. Finally, the method includes providing instructions to navigate, based on the position of the target drop-off spot within the second virtual model, the delivery vehicle to the target drop-off spot to place the object at the target drop-off spot.

In another example a system is provided that includes a delivery vehicle, one or more sensors connected to the delivery vehicle, and a control system. The control system is configured to receive an indication of a target drop-off spot for an object within a first virtual model of a first region of a delivery destination. The first virtual model represents first physical features of the first region of the delivery destination. The control system is also configured to receive, from the one or more sensors, sensor data indicative of a second region of the delivery destination. The control system is additionally configured to determine, based on the sensor data, a second virtual model of the second region of the delivery destination. The second virtual model represents second physical features of the second region on the delivery destination. The control system is further configured to determine a mapping between one or more of the first physical features and one or more of the second physical features to determine an overlapping region between the first virtual model and the second virtual model. The control system is yet further configured to determine a position of the target drop-off spot within the second virtual model based on the overlapping region. Finally, the control system is configured to provide instructions to navigate, based on the position of the target drop-off spot within the second virtual model, the delivery vehicle to the target drop-off spot to place the object at the target drop-off spot.

In an additional example, a non-transitory computer-readable storage medium is provided having stored thereon instructions that, when executed by a computing device, cause the computing device to perform operations. The operations include receiving, from a client computing device, an indication of a target drop-off spot for an object within a first virtual model of a first region of a delivery destination. The first virtual model represents first physical features of the first region of the delivery destination. The operations also include receiving, from one or more sensors on a delivery vehicle, sensor data indicative of a second region of the delivery destination. The operations additionally include determining, based on the sensor data, a second virtual model of the second region of the delivery destination. The second virtual model represents second physical features of the second region on the delivery destination. The operations further include determining a mapping between one or more of the first physical features and one or more of the second physical features to determine an overlapping region between the first virtual model and the second virtual model. The operations yet further include determining, based on the overlapping region, a position of the target drop-off spot within the second virtual model. Finally, the operations include providing instructions to navigate, based on the position of the target drop-off spot within the second virtual model, the delivery vehicle to the target drop-off spot to place the object at the target drop-off spot.

In a further example, a system is provided that includes means for receiving, from a client computing device, an indication of a target drop-off spot for an object within a first virtual model of a first region of a delivery destination. The first virtual model represents first physical features of the first region of the delivery destination. The system also includes means for receiving, from one or more sensors on a delivery vehicle, sensor data indicative of a second region of the delivery destination. The system additionally includes means for determining, based on the sensor data, a second virtual model of the second region of the delivery destination. The second virtual model represents second physical features of the second region on the delivery destination. The system further includes means for determining a mapping between one or more of the first physical features and one or more of the second physical features to determine an overlapping region between the first virtual model and the second virtual model. The system yet further includes means for determining, based on the overlapping region, a position of the target drop-off spot within the second virtual model. Finally, the system includes means for providing instructions to navigate, based on the position of the target drop-off spot within the second virtual model, the delivery vehicle to the target drop-off spot to place the object at the target drop-off spot.

The foregoing summary is illustrative only and is not intended to be in any way limiting. In addition to the illustrative aspects, embodiments, and features described above, further aspects, embodiments, and features will become apparent by reference to the figures and the following detailed description and the accompanying drawings.

BRIEF DESCRIPTION OF THE DRAWINGS

FIG. 7B illustrates another example of a virtual model of a delivery destination, according to an example embodiment.

DETAILED DESCRIPTION

Figure 1A:
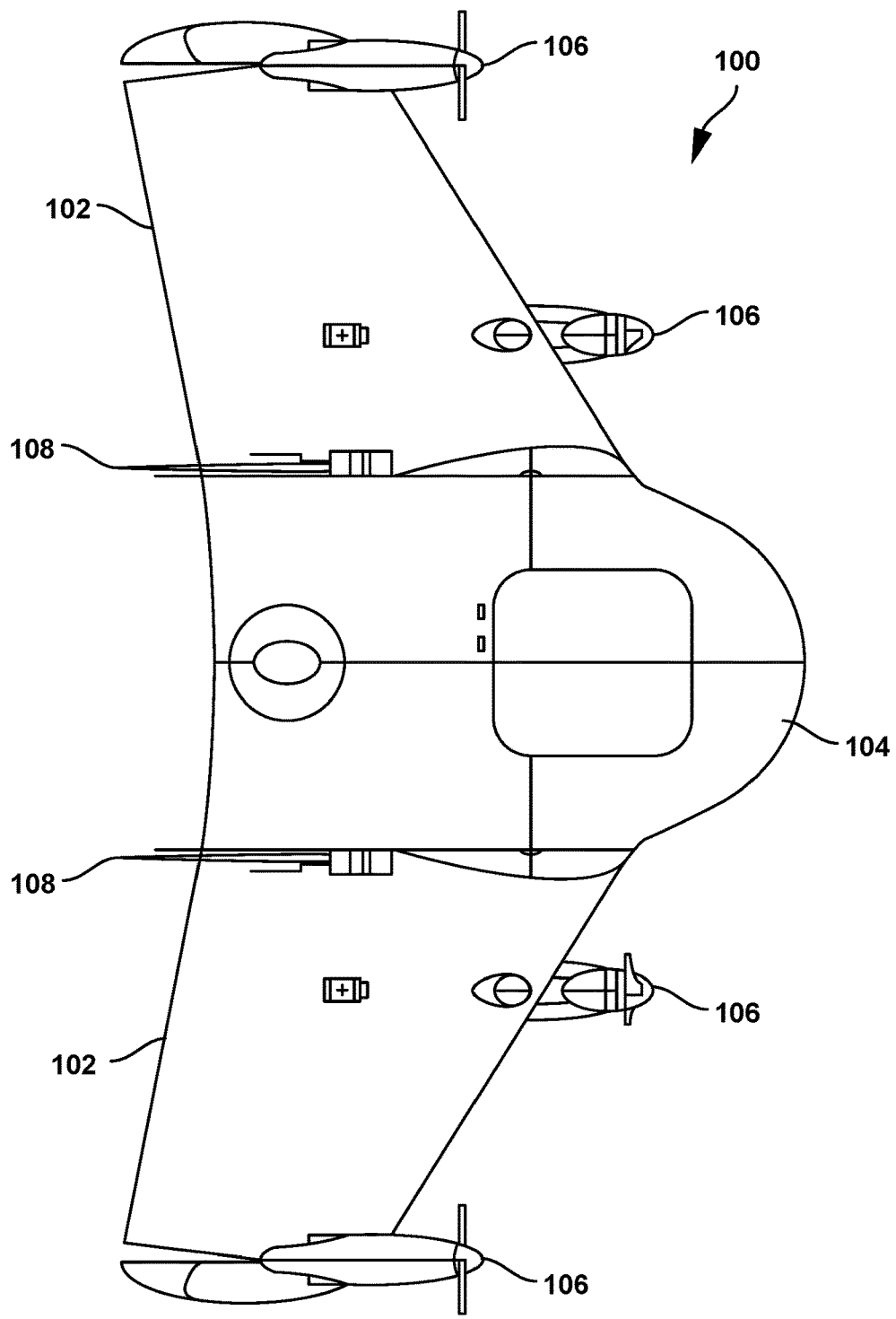
FIG. 1A illustrates an unmanned aerial vehicle, according to an example embodiment.

The following detailed description describes various features and operations of the disclosed devices, systems, and methods with reference to the accompanying figures. The illustrative device, system, and method embodiments described herein are not meant to be limiting. It should be understood that the words "exemplary," "example," and "illustrative," are used herein to mean "serving as an example, instance, or illustration." Any implementation, embodiment, or feature described herein as "exemplary," "example," or "illustrative," is not necessarily to be construed as preferred or advantageous over other implementations, embodiments, or features. Further, aspects of the present disclosure, as generally described herein and illustrated in the figures, can be arranged, substituted, combined, separated, and designed in a wide variety of different configurations.

In the following detailed description, reference is made to the accompanying figures, which form a part thereof. In the figures, similar symbols typically identify similar components, unless context dictates otherwise. Other embodiments may be utilized, and other changes may be made, without departing from the spirit or scope of the subject matter presented herein. Further, unless otherwise noted, figures are not drawn to scale and are used for illustrative purposes only. Moreover, the figures are representational only and not all components are shown. For example, additional structural or restraining components might not be shown.

I. Overview

Package delivery services currently rely on human delivery people to use their judgment and intuition in finding a delivery destination (e.g., home or work address) and selecting a spot at the delivery destination in which to place a package upon delivery (e.g., front porch, side door, etc.). As package delivery services begin to employ unmanned delivery vehicles, package recipients may have more control over when packages are delivered, the delivery destination to which packages are delivered, as well as the spot at which packages are placed upon delivery. For example, in addition to the existing paradigm of delivery to home or work, unmanned delivery vehicles may be scheduled to deliver packages to locations other than a recipient's home (e.g., current user location such as a cafe, restaurant, gym, etc.) at precise, user-specified times. Additionally, recipients may be able to designate a precise target drop-off spot for a package. For instance, recipients may specify spots where the package will not be at risk of theft and will not block doors or walkways.

In an example embodiment, a client computing device (e.g., phone, tablet, or other computing device equipped with or connectable to sensors) may be used to designate a target drop-off spot for a package within a delivery destination (i.e., the target spot may be a smaller subset of the delivery destination). Specifically, the package recipient may use the client computing device to capture video or photos of a region of the delivery destination to which the package is to be delivered. For example, the recipient may capture a video or a series of photos of a front porch of the recipient's home. Each photo or video frame may be associated with additional sensor data from sensors on or connected to the client computing device such as gyroscopes, magnetometers, accelerometers, and global positioning system (GPS) module.

The captured data may be used to generate a virtual model representing the region of the delivery destination to which the package is to be delivered. The virtual model may contain representations of physical features of the delivery destination (e.g., trees, bushes, windows, doors, stairs, neighboring homes, etc.). The virtual model may be displayed by way of a user interface of the client computing device and the user may be prompted to designate a target drop-off spot within the virtual model.

The client computing device may receive input indicating selection or designation of a spot within the virtual model. For example, the designation may be visualized by displaying a "bullseye" target marker at the designated spot within the virtual model. The location of the target marker within the virtual model may indicate a physical location at which the user prefers to have the package dropped off upon delivery. The marker may be movable within the virtual model and may "snap" to surfaces represented within the model. In some embodiments, the target drop-off spot may be designated directly within one or more of the captured images or video frames, prior to generation of the model. The operations of model generation may, based on the target drop-off spot designation within each image, determine the position of the target drop-off spot within the virtual model.

Upon marker placement, a validation may be performed to determine whether the delivery vehicle is capable of navigating to the target drop-off spot and whether the package, based on anticipated size and shape of the package, is expected to fit and/or rest securely in the target drop-off spot.

In some instances, a virtual model may be available from a prior package delivery to a selected delivery destination. Accordingly, the operations for generating the virtual model may be omitted and the user may proceed with designating a target drop-off spot within an existing model or selecting a previously designated target drop-off spot within the model.

The virtual model and the indication of the target drop-off spot within the model may be transmitted to a server device, to a delivery vehicle, and/or may be stored locally on the client computing device. A delivery vehicle (e.g., aerial drone, ground vehicle, water-based vehicle, or a hybrid thereof) may be dispatched to deliver the requested package to the delivery destination. The delivery vehicle may navigate to the general vicinity of the delivery destination based on GPS information. When the delivery vehicle arrives within a threshold distance of the GPS coordinates of the delivery destination, GPS information may lack the necessary accuracy to allow for navigation of the vehicle to the target drop-off spot within the delivery destination.

Accordingly, the delivery vehicle may begin capturing sensor data from sensors on the delivery vehicle (e.g., cameras, depth sensors, light detection and ranging (LIDAR) device, accelerometers, magnetometers, gyroscopes, etc.) to generate a second virtual model that the vehicle will use to locate and navigate to the target drop-off spot. The delivery vehicle may include some or all of the sensors that are included on the client computing device. Additionally, the delivery vehicle may include additional sensors that aid in vehicle navigation and may be used to generate the second virtual model (e.g., altimeters in the case of an aerial vehicle).

A second virtual model may be generated based on the sensor data from the delivery vehicle. A mapping may be determined of representations of physical features between the first virtual model (e.g., the user-specified model) and the second virtual model. The mapping may be used to determine an overlapping region between the first model and the second model. Stated another way, the mapping may be used to spatially align the second model with the first model to identify a region of the delivery destination common to both models. In some embodiments, the mapping may be determined by directly comparing the first model to the second model. Alternatively, the mapping may be determined by comparing each of the first model and the second model to a master virtual model representing the geographic area surrounding the delivery destination. Based on the overlapping region, the system may determine the position of the target drop-off spot within the second virtual model.

In some instances, before a complete second model is determined, the initial portions of the second model might not yet represent the region of the delivery destination containing the target drop-off spot. However, the second model may overlap with a portion of the first model that does not represent the target drop-off spot. Based on this overlap/alignment, the control system of the delivery vehicle may determine to navigate the vehicle to scan the region of the environment estimated to contain the target drop-off spot. In response, the second model may be expanded and updated to represent the region containing the target drop-off spot and, based on the mapping between the models, a position of the target drop-off spot within the second virtual model may be determined.

In some instances, due to GPS positioning error, the delivery vehicle may initially scan a region next to the delivery destination that does not overlap with the region of the delivery destination scanned by the user of the client computing device. Accordingly, the system might not be able to determine a mapping and may cause the delivery vehicle to continue systematically scanning other regions near the delivery vehicle until a region is found that overlaps with the user-specified region (e.g., region represented by the first virtual model).

Alternatively or additionally, a master virtual model or map may be used to determine the mapping between the first and second virtual models. Namely, a mapping may be determined between the master model and each of the first and second models. The determined mapping may be used to locate each of the first and second models within the master model and thus determine the geographic positioning of the second model with respect to the first model. Accordingly, instead of systematically scanning the area to find an overlapping region, the system may use the master model to determine a direction or trajectory along which to navigate the delivery vehicle to locate the delivery destination and the target drop-off spot therein. While navigating along the determined trajectory, the delivery vehicle may scan portions of the delivery destination to build up the second virtual model to represent the target drop-off spot within the second virtual model. Thus, based on the relative geographic positioning of the first and second models, the system may locate the target drop-off spot within the second virtual model.

The master model may be generated and updated based on previously-generated virtual models of various delivery destinations within a geographic region surrounding the current delivery destination. The master model may, in some examples, be used as a backup when a mapping cannot be determined directly between the first and second virtual models. In particular, when the control system is unable to map a region scanned by the delivery vehicle to the environment scanned by the client computing device, the system may attempt to map both regions to the master model of the geographic location surrounding the delivery destination. A successful mapping may allow the system to determine the relative spatial positioning between the region scanned by the client computing device and the region scanned by the delivery vehicle. Thus, the system may determine a direction in which to navigate the delivery vehicle to find the delivery destination.

For example, due to GPS error, the delivery vehicle may initially scan a house to the east of the delivery destination. The system might be unable to map physical features of the scanned house to physical features within the region specified by the client computing device. However, a mapping may be determined between physical features of the scanned house and a portion of the master model representing the scanned house. Accordingly, the system may determine that the delivery vehicle is too far east of the delivery destination and may cause the delivery vehicle to navigate west. Thus, the delivery destination may be successfully scanned and a mapping may be determined between the first and second virtual models. Alternatively, in some embodiments, the master model may be used continuously in the mapping operations.

The mapping and the overlapping region between the first and second models may be used to determine a position of the target drop-off spot within the second virtual model, regardless of whether a master model is employed. The position of the target drop-off spot may be used to determine the relative spatial positioning between the delivery vehicle and the target drop-off spot. Thus, the delivery vehicle may be navigated to the target drop-off spot to place the package at the target drop-off spot, as requested by the package recipient. In some embodiments, a human operator may take control of the delivery vehicle remotely and may navigate the vehicle to the target drop-off spot. The human operator may be presented with visual cues indicating where the system is expecting the delivery destination and the target drop-off spot to be located. Thus, the operations herein described may be used to aid the human operator's decision-making in navigating the delivery vehicle. Additionally, the operations herein described may be localized to or distributed between any combination of the client computing device, remote server devices, and the delivery vehicles.

Further, in some embodiments, the delivery vehicle may be replaced by a second client computing device associated with a delivery person. Instead of navigating the delivery vehicle, the operations herein described may be used to guide the delivery person to the target drop-off spot designated by the package recipient. Namely, the second client computing device may display visual cues to guide the delivery person in scanning the delivery destination to generate the second model. Once the second model is generated, the position of the target drop-off spot may be determined and may be displayed by the second client computing device as a virtual-reality marker to indicate to the delivery person where to place the package. For example, the second computing device may display a live video feed from the camera of the device and, when the camera is panned over the target drop-off spot, a marker may be displayed in the video feed indicating the target drop-off spot. Accordingly, packages may be placed in safer and/or more convenient locations by delivery people.

II. Example Unmanned Delivery Vehicle Systems

Herein, the terms "unmanned delivery vehicle" and "UDV" refer to any autonomous or semi-autonomous vehicle that is capable of performing some functions without a physically present human pilot.

A UDV can take various forms. A UDV may be a ground vehicle, an aerial vehicle, a water vehicle, or a multi-terrain hybrid. For example, a ground UDV may take the form of a ground vehicle that includes a base adapted for ground movement by way of wheels, tracks, or legs. The ground UDV may include a robotic arm to allow the UDV to move payload to and from the UDV. In another example, an aerial UDV may take the form of a fixed-wing aircraft, a glider aircraft, a tail-sitter aircraft, a jet aircraft, a ducted fan aircraft, a lighter-than-air dirigible such as a blimp or steerable balloon, a rotorcraft such as a helicopter or multicopter, and/or an ornithopter, among other possibilities. Further, the terms "drone," "unmanned aerial vehicle" (UAV), "unmanned aerial vehicle system" (UAVS), or "unmanned aerial system" (UAS) may also be used to refer to a UDV. In a further example, a water-based UDV may take the form of a boat, hovercraft, or submarine, among other possibilities.

FIG. 1A illustrates a simplified top-down view of a UAV, according to an example embodiment. In particular, FIG. 1A shows an example of a fixed-wing UAV 100, which may also be referred to as an airplane, an aeroplane, a biplane, a glider, or a plane, among other possibilities. The fixed-wing UAV 100, as the name implies, has stationary wings 102 that generate lift based on the wing shape and the vehicle's forward airspeed. For instance, the two wings 102 may have an airfoil-shaped cross section to produce an aerodynamic force on the UAV 100.

As depicted, the fixed-wing UAV 100 may include a wing body 104 rather than a clearly defined fuselage. The wing body 104 may contain, for example, control electronics such as an inertial measurement unit (IMU) and/or an electronic speed controller, batteries, other sensors, and/or a payload, among other possibilities. The illustrative UAV 100 may also include landing gear (not shown) to assist with controlled take-offs and landings. In other embodiments, other types of UAVs without landing gear are also possible.

The UAV 100 further includes propulsion units 106, which can each include a motor, shaft, and propeller, for propelling the UAV 100. Vertical stabilizers 108 (or fins) may also be attached to the wing body 104 and/or the wings 102 to stabilize the UAV's yaw (i.e., left or right turn) during flight. In some embodiments, the UAV 100 may be also be configured to function as a glider. To do so, UAV 100 may power off its motor, propulsion units, etc., and glide for a period of time.

During flight, the UAV 100 may control the direction and/or speed of its movement by controlling its pitch, roll, yaw, and/or altitude. For example, the vertical stabilizers 108 may include one or more rudders for controlling the UAV's yaw, and the wings 102 may include one or more elevators for controlling the UAV's pitch and/or one or more ailerons for controlling the UAV's roll. As another example, increasing or decreasing the speed of all the propellers simultaneously can result in the UAV 100 increasing or decreasing its altitude, respectively.

Figure 1B:
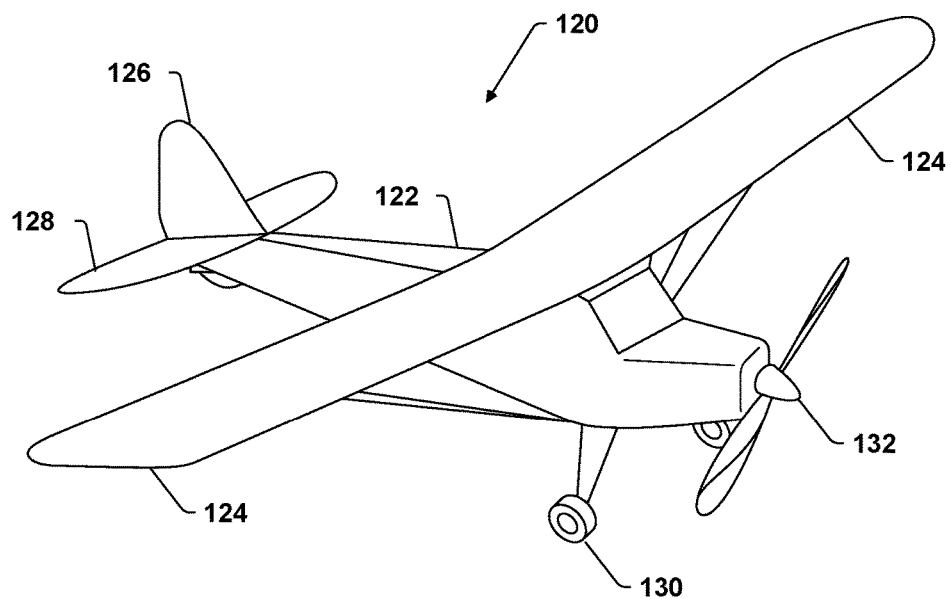
FIG. 1B illustrates an unmanned aerial vehicle, according to an example embodiment.

Similarly, FIG. 1B shows another example of a fixed-wing UAV 120. The fixed-wing UAV 120 includes a fuselage 122, two wings 124 with an airfoil-shaped cross section to provide lift for the UAV 120, a vertical stabilizer 126 (or fin) to stabilize the plane's yaw (i.e., left or right turn), a horizontal stabilizer 128 (also referred to as an elevator or tailplane) to stabilize pitch (tilt up or down), landing gear 130, and a propulsion unit 132, which can include a motor, shaft, and propeller.

Figure 1C:
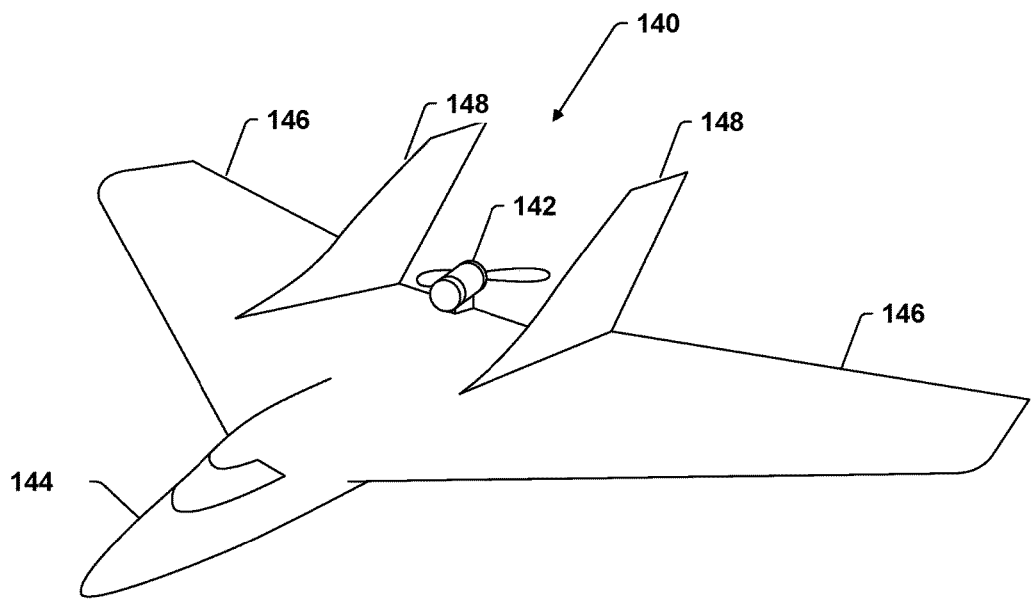
FIG. 1C illustrates an unmanned aerial vehicle, according to an example embodiment.

FIG. 1C shows an example of a UAV 140 with a propeller in a pusher configuration. The term "pusher" refers to the fact that a propulsion unit 142 is mounted at the back of the UAV and "pushes" the vehicle forward, in contrast to the propulsion unit being mounted at the front of the UAV. Similar to the description provided for FIGS. 1A and 1B, FIG. 1C depicts common structures used in a pusher plane, including a fuselage 144, two wings 146, vertical stabilizers 148, and the propulsion unit 142, which can include a motor, shaft, and propeller.

Figure 1D:
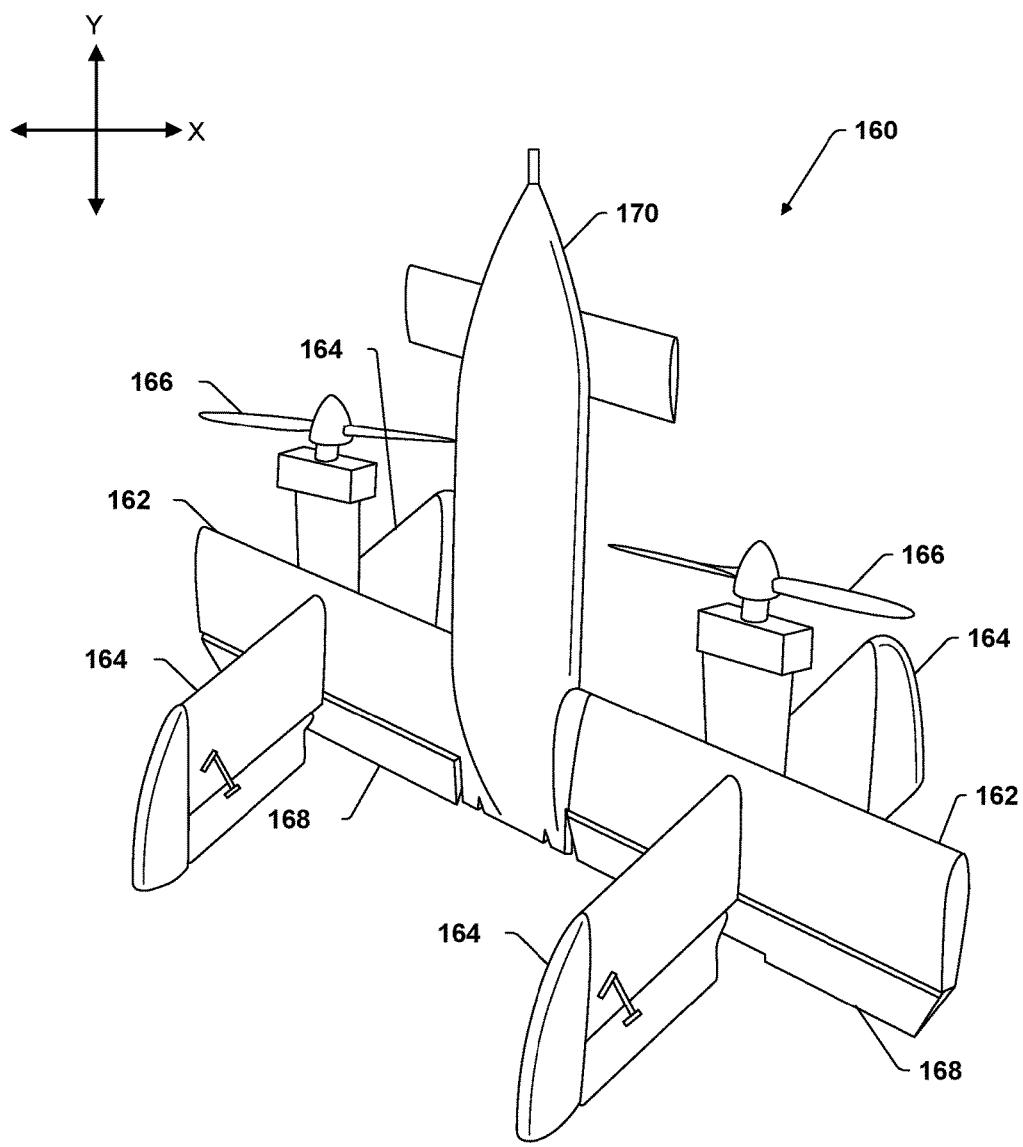
FIG. 1D illustrates an unmanned aerial vehicle, according to an example embodiment.

FIG. 1D shows an example of a tail-sitter UAV 160. In the illustrated example, the tail-sitter UAV 160 has fixed wings 162 to provide lift and allow the UAV 160 to glide horizontally (e.g., along the x-axis, in a position that is approximately perpendicular to the position shown in FIG. 1D). Additionally, the fixed wings 162 also allow the tail-sitter UAV 160 to take off and land vertically.

For example, at a launch site, the tail-sitter UAV 160 may be positioned vertically (as shown) with its fins 164 and/or wings 162 resting on the ground and stabilizing the UAV 160 in the vertical position. The tail-sitter UAV 160 may then take off by operating its propellers 166 to generate an upward thrust (e.g., a thrust that is generally along the y-axis). Once at a suitable altitude, the tail-sitter UAV 160 may use its flaps 168 to reorient itself in a horizontal position, such that its fuselage 170 is closer to being aligned with the x-axis than the y-axis. Positioned horizontally, the propellers 166 may provide forward thrust so that the tail-sitter UAV 160 can fly in a similar manner as a typical airplane.

Many variations on the illustrated fixed-wing UAVs are possible. For instance, fixed-wing UAVs may include more or fewer propellers, and/or may utilize a ducted fan or multiple ducted fans for propulsion. Further, UAVs with more wings (e.g., an "x-wing" configuration with four wings), with fewer wings, or even with no wings, are also possible.

Figure 1E:
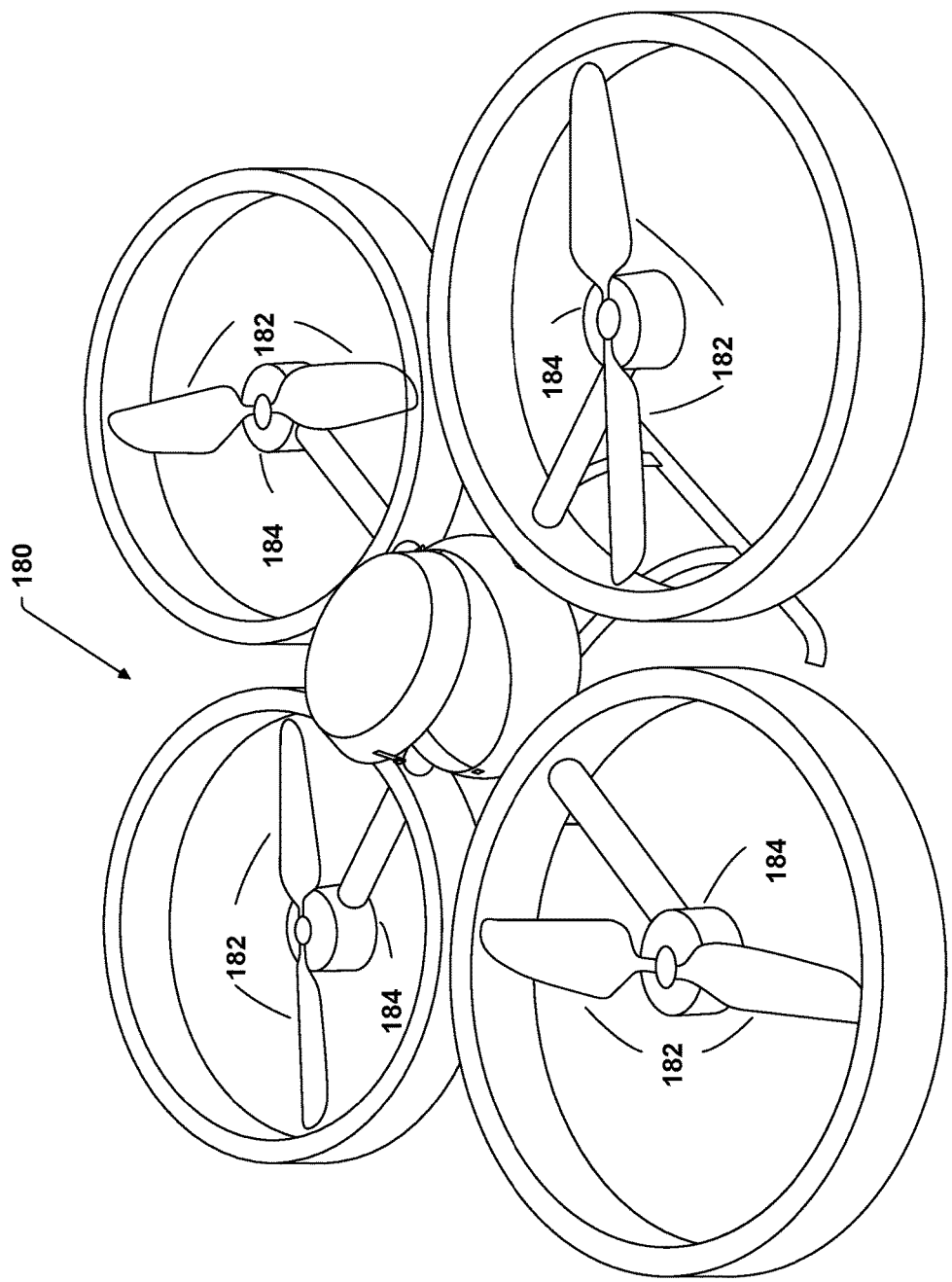
FIG. 1E illustrates an unmanned aerial vehicle, according to an example embodiment.

As noted above, some embodiments may involve other types of UAVs, in addition to or in the alternative to fixed-wing UAVs. For instance, FIG. 1E shows an example of a rotorcraft that is commonly referred to as a multicopter 180. The multicopter 180 may also be referred to as a quadcopter, as it includes four rotors 182. It should be understood that example embodiments may involve a rotorcraft with more or fewer rotors than the multicopter 180. For example, a helicopter typically has two rotors. Other examples with three or more rotors are possible as well. Herein, the term "multicopter" refers to any rotorcraft having more than two rotors, and the term "helicopter" refers to rotorcraft having two rotors.

Referring to the multicopter 180 in greater detail, the four rotors 182 provide propulsion and maneuverability for the multicopter 180. More specifically, each rotor 182 includes blades that are attached to a motor 184. Configured as such, the rotors 182 may allow the multicopter 180 to take off and land vertically, to maneuver in any direction, and/or to hover. Further, the pitch of the blades may be adjusted as a group and/or differentially, and may allow the multicopter 180 to control its pitch, roll, yaw, and/or altitude.

It should be understood that references herein to an "unmanned" delivery vehicle or UDV can apply equally to autonomous and semi-autonomous vehicles. In an autonomous implementation, all functionality of the vehicle is automated; e.g., pre-programmed or controlled via real-time computer functionality that responds to input from various sensors and/or predetermined information. In a semi-autonomous implementation, some functions of the vehicle may be controlled by a human operator, while other functions are carried out autonomously. Further, in some embodiments, a UDV may be configured to allow a remote operator to take over functions that can otherwise be controlled autonomously by the UDV. Yet further, a given type of function may be controlled remotely at one level of abstraction and performed autonomously at another level of abstraction. For example, a remote operator could control high level navigation decisions for a UDV, such as by specifying that the UDV should travel from one location to another (e.g., from a warehouse in a suburban area to a delivery address in a nearby city), while the UDV's navigation system autonomously controls more fine-grained navigation decisions, such as the specific route to take between the two locations, specific flight controls to achieve the route and avoid obstacles while navigating the route, and so on.

More generally, it should be understood that the example UDVs described herein are not intended to be limiting. Example embodiments may relate to, be implemented within, or take the form of any type of unmanned delivery vehicle.

III. Example UDV Components

Figure 2:
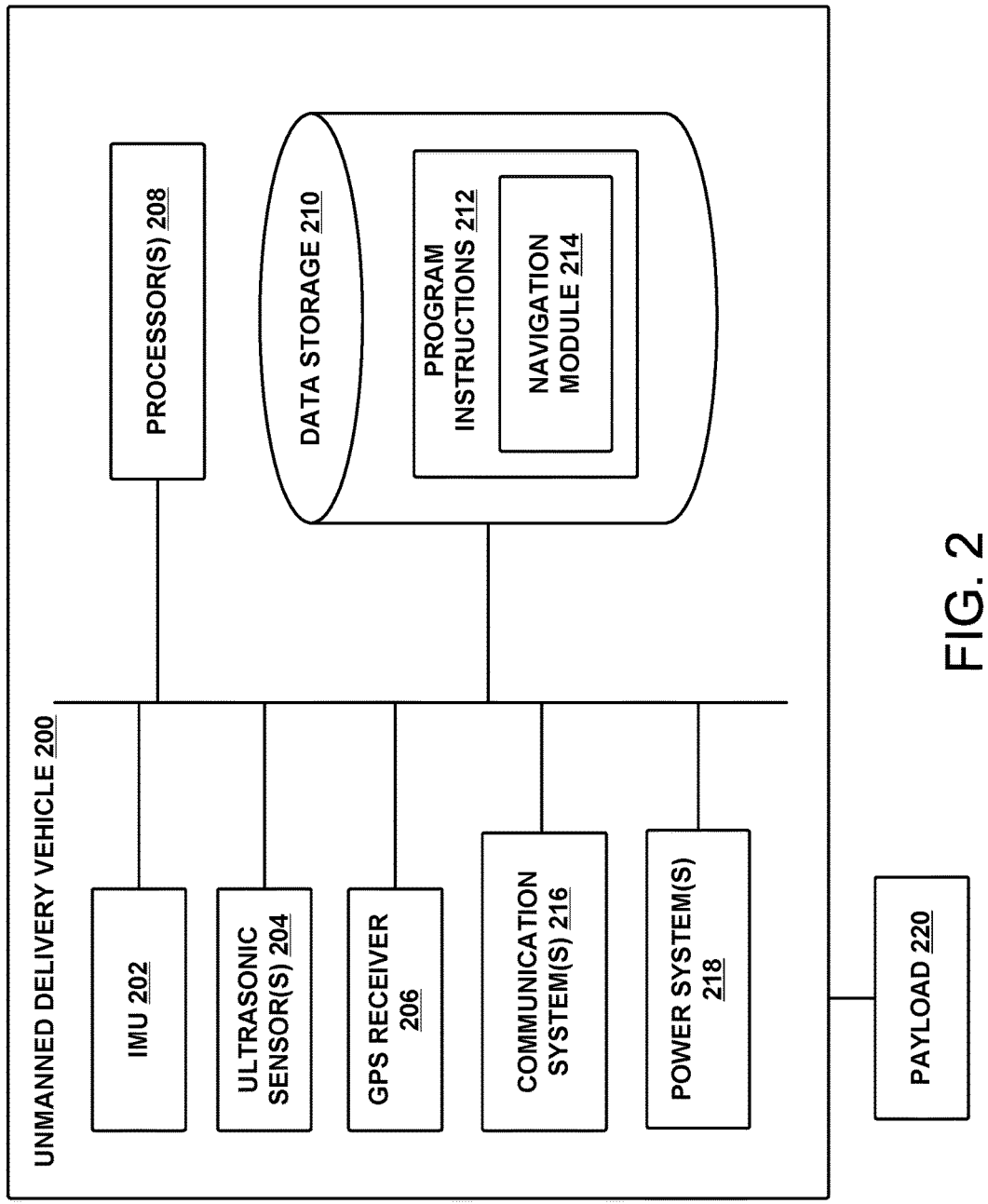
FIG. 2 illustrates a block diagram of components of an unmanned delivery vehicle, according to an example embodiment.

FIG. 2 is a simplified block diagram illustrating components of a unmanned delivery vehicle 200, according to an example embodiment. UDV 200 may take the form of, or be similar in form to, one of the UDVs 100, 120, 140, 160, 180, and 190 described in reference to FIGS. 1A-1E. However, UDV 200 may also take other forms.

UDV 200 may include various types of sensors, and may include a computing system configured to provide the functionality described herein. In the illustrated embodiment, the sensors of UDV 200 include an inertial measurement unit (IMU) 202, ultrasonic sensor(s) 204, and a GPS 206, among other possible sensors and sensing systems.

In the illustrated embodiment, UDV 200 also includes one or more processors 208. A processor 208 may be a general-purpose processor or a special purpose processor (e.g., digital signal processors, application specific integrated circuits, etc.). The one or more processors 208 can be configured to execute computer-readable program instructions 212 that are stored in the data storage 210 and are executable to provide the functionality of a UDV described herein.

The data storage 210 may include or take the form of one or more computer-readable storage media that can be read or accessed by at least one processor 208. The one or more computer-readable storage media can include volatile and/or non-volatile storage components, such as optical, magnetic, organic or other memory or disc storage, which can be integrated in whole or in part with at least one of the one or more processors 208. In some embodiments, the data storage 210 can be implemented using a single physical device (e.g., one optical, magnetic, organic or other memory or disc storage unit), while in other embodiments, the data storage 210 can be implemented using two or more physical devices.

As noted, the data storage 210 can include computer-readable program instructions 212 and perhaps additional data, such as diagnostic data of the UDV 200. As such, the data storage 210 may include program instructions 212 to perform or facilitate some or all of the UDV functionality described herein. For instance, in the illustrated embodiment, program instructions 212 include a navigation module 214.

A. Sensors

In an illustrative embodiment, IMU 202 may include both an accelerometer and a gyroscope, which may be used together to determine an orientation of the UDV 200. In particular, the accelerometer can measure the orientation of the vehicle with respect to earth, while the gyroscope measures the rate of rotation around an axis. IMU 202 may take the form of or include a miniaturized MicroElectroMechanical System (MEMS) or a NanoElectroMechanical System (NEMS). Other types of IMUs may also be utilized.

An IMU 202 may include other sensors, in addition to accelerometers and gyroscopes, which may help to better determine position and/or help to increase autonomy of the UDV 200. Two examples of such sensors are magnetometers and pressure sensors. In some embodiments, a UDV may include a low-power, digital 3-axis magnetometer, which can be used to realize an orientation independent electronic compass for accurate heading information. However, other types of magnetometers may be utilized as well. Other examples are also possible. Further, a UDV may include some or all of the above-described inertia sensors as separate components from an IMU.

An aerial implementation of UDV 200 may also include a pressure sensor or barometer, which can be used to determine the altitude of the UDV 200. Alternatively, other sensors, such as sonic altimeters or radar altimeters, can be used to provide an indication of altitude, which may help to improve the accuracy of and/or prevent drift of an IMU.

In a further aspect, UDV 200 may include one or more sensors that allow the UDV to sense objects in the environment. For instance, in the illustrated embodiment, UDV 200 includes ultrasonic sensor(s) 204. Ultrasonic sensor(s) 204 can determine the distance to an object by generating sound waves and determining the time interval between transmission of the wave and receiving the corresponding echo off an object. A typical application of an ultrasonic sensor for unmanned vehicles is obstacle avoidance and, in the case of aerial vehicles, low-level altitude control. An ultrasonic sensor can also be used for vehicles that need to hover at a certain height or need to be capable of detecting obstacles. Other systems can be used to determine, sense the presence of, and/or determine the distance to nearby objects, such as a light detection and ranging (LIDAR) system, laser detection and ranging (LADAR) system, and/or an infrared or forward-looking infrared (FLIR) system, among other possibilities.

In some embodiments, UDV 200 may also include one or more imaging system(s). For example, one or more still and/or video cameras may be utilized by UDV 200 to capture image data from the UDV's environment. As a specific example, charge-coupled device (CCD) cameras or complementary metal-oxide-semiconductor (CMOS) cameras can be used with unmanned vehicles. Such imaging sensor(s) have numerous possible applications, such as obstacle avoidance, localization techniques, ground tracking for more accurate navigation (e.g., by applying optical flow techniques to images), video feedback, and/or image recognition and processing, among other possibilities.

UDV 200 may also include a GPS receiver 206. The GPS receiver 206 may be configured to provide data that is typical of well-known GPS systems, such as the GPS coordinates of the UDV 200. Such GPS data may be utilized by the UDV 200 for various functions. As such, the UDV may use its GPS receiver 206 to help navigate to a delivery destination for an ordered package, as indicated, at least in part, by GPS coordinates provided by a mobile device associated with a user placing the package order. Other examples are also possible.

B. Navigation and Location Determination

The navigation module 214 may provide functionality that allows the UDV 200 to move about its environment and reach a desired location (e.g., a delivery destination). To do so, the navigation module 214 may control the mechanical features of the UDV. For example, in an aerial UDV, navigation module 214 may control the altitude and/or direction of flight by controlling the mechanical features of the UDV that affect flight (e.g., its rudder(s), elevator(s), aileron(s), and/or the speed of its propeller(s)). In a ground UDV, the navigation module may control vehicle speed and direction by controlling the motors that drive the wheels or tracks and the actuators that control the vehicle steering.

In order to navigate the UDV 200 to a desired location, the navigation module 214 may implement various navigation techniques, such as map-based navigation and localization-based navigation, for instance. With map-based navigation, the UDV 200 may be provided with a map of its environment, which may then be used to navigate to a particular location on the map. With localization-based navigation, the UDV 200 may be capable of navigating in an unknown environment using localization. Localization-based navigation may involve the UDV 200 building its own map of its environment and calculating its position within the map and/or the position of objects in the environment. For example, as a UDV 200 moves throughout its environment, the UDV 200 may continuously use localization to update its map of the environment. This continuous mapping process may be referred to as simultaneous localization and mapping (SLAM). Other navigation techniques may also be utilized.

In some embodiments, the navigation module 214 may navigate using a technique that relies on waypoints. In particular, waypoints are sets of coordinates that identify points in physical space. For instance, an air-navigation waypoint may be defined by a certain latitude, longitude, and altitude. Accordingly, navigation module 214 may cause UDV 200 to move from waypoint to waypoint, in order to ultimately travel to a final destination (e.g., a final waypoint in a sequence of waypoints).

In a further aspect, the navigation module 214 and/or other components and systems of the UDV 200 may be configured for "localization" to more precisely navigate to a target spot within a general destination. More specifically, it may be desirable in certain situations for a UDV to be within a threshold distance of the target spot in the general destination (e.g., a target drop-off spot within a delivery destination) where a payload 220 is being delivered by a UDV. To this end, a UDV may use a two-tiered approach in which it uses a more-general location-determination technique to navigate to the general destination (e.g., delivery destination) that is associated with the target spot (e.g., target drop-off spot for an object), and then use a more-refined location-determination technique to identify and/or navigate to the target spot within the general destination.

For example, the UDV 200 may navigate to the general vicinity of a delivery destination where a payload 220 is being delivered using waypoints and/or map-based navigation. The UDV may then switch to a mode in which it utilizes a localization process to locate and travel to a target spot within the delivery destination. For instance, if the UDV 200 is to deliver a payload to a user's home, the UDV 200 may need to be substantially close to the target drop-off spot for the payload in order to avoid delivery of the payload to undesired areas (e.g., onto a roof, into a pool, onto a neighbor's property, etc.). However, a GPS signal may be limited to accurately guiding the UDV 200 to within a threshold distance of the delivery destination (e.g., within a block of the user's home) due to inherent accuracy limits of GPS systems. A more precise location-determination technique may then be used to find the specific target drop-off spot within the general vicinity of the delivery destination.

Various types of location-determination techniques may be used to accomplish localization of the target spot once the UDV 200 has navigated to the general vicinity of the delivery destination. For instance, the UDV 200 may be equipped with one or more sensory systems, such as, for example, ultrasonic sensors 204, infrared sensors (not shown), and/or other sensors, which may provide input that the navigation module 214 utilizes to navigate autonomously or semi-autonomously to the specific target spot.

As another example, once the UDV 200 reaches the general vicinity of the delivery destination (or of a moving subject such as a person or their mobile device), the UDV 200 may switch to a "fly-by-wire" mode where it is controlled, at least in part, by a remote operator, who can navigate the UDV 200 to the target drop-off spot within the delivery destination. To this end, sensory data from the UDV 200 may be sent to the remote operator to assist them in navigating the UDV 200 to the target drop-off spot.

As yet another example, the UDV 200 may include a module that is able to signal to a passer-by for assistance in reaching the specific target delivery location. For example, the UDV 200 may display a visual message requesting such assistance in a graphic display and/or play an audio message or tone through speakers to indicate the need for such assistance, among other possibilities. Such a visual or audio message might indicate that assistance is needed in delivering the UDV 200 to a particular person or a particular destination, and might provide information to assist the passer-by in delivering the UDV 200 to the person or location (e.g., a description or picture of the person or location), among other possibilities. Such a feature can be useful in a scenario in which the UDV is unable to use sensory functions or another location-determination technique to reach the specific target spot within a delivery destination. However, this feature is not limited to such scenarios.

In some embodiments, once the UDV 200 arrives at the general vicinity of a delivery destination, the UDV 200 may utilize a beacon from a user's remote device (e.g., the user's mobile phone) to locate the person. Such a beacon may take various forms. As an example, consider the scenario where a remote device, such as the mobile phone of a person who requested a UDV delivery, is able to send out directional signals (e.g., via an RF signal, a light signal and/or an audio signal). In this scenario, the UDV 200 may be configured to navigate by "sourcing" such directional signals—in other words, by determining where the signal is strongest and navigating accordingly. As another example, a mobile device can emit a frequency, either in the human range or outside the human range, and the UDV 200 can listen for that frequency and navigate accordingly. As a related example, if the UDV 200 is listening for spoken commands, then the UDV 200 could utilize spoken statements, such as "I'm over here!" to source the specific location of the person requesting delivery of a payload.

In an alternative arrangement, a navigation module may be implemented at a remote computing device, which communicates wirelessly with the UDV 200. The remote computing device may receive data indicating the operational state of the UDV 200, sensor data from the UDV 200 that allows it to assess the environmental conditions being experienced by the UDV 200, and/or location information for the UDV 200. Provided with such information, the remote computing device may determine altitudinal and/or directional adjustments that should be made by the UDV 200 and/or may determine how the UDV 200 should adjust its mechanical features (e.g., its wheel(s), track(s), leg(s), rudder(s), elevator(s), aileron(s), and/or the speed of its propeller(s)) in order to effectuate such movements. The remote computing system may then communicate such adjustments to the UDV 200 so it can move in the determined manner.

C. Communication System

In a further aspect, the UDV 200 includes one or more communication systems 216. The communications systems 216 may include one or more wireless interfaces and/or one or more wireline interfaces, which allow the UDV 200 to communicate via one or more networks. Such wireless interfaces may provide for communication under one or more wireless communication protocols, such as Bluetooth, WiFi (e.g., an IEEE 802.11 protocol), Long-Term Evolution (LTE), WiMAX (e.g., an IEEE 802.16 standard), a radio-frequency ID (RFID) protocol, near-field communication (NFC), and/or other wireless communication protocols. Such wireline interfaces may include an Ethernet interface, a Universal Serial Bus (USB) interface, or similar interface to communicate via a wire, a twisted pair of wires, a coaxial cable, an optical link, a fiber-optic link, or other physical connection to a wireline network.

In some embodiments, a UDV 200 may include communication systems 216 that allow for both short-range communication and long-range communication. For example, the UDV 200 may be configured for short-range communications using Bluetooth and for long-range communications under a CDMA protocol. In such an embodiment, the UDV 200 may be configured to function as a "hotspot," or in other words, as a gateway or proxy between a remote support device and one or more data networks, such as a cellular network and/or the Internet. Configured as such, the UDV 200 may facilitate data communications that the remote support device would otherwise be unable to perform by itself.

For example, the UDV 200 may provide a WiFi connection to a remote device, and serve as a proxy or gateway to a cellular service provider's data network, which the UDV might connect to under an LTE or a 3G protocol, for instance. The UDV 200 could also serve as a proxy or gateway to a high-altitude balloon network, a satellite network, or a combination of these networks, among others, which a remote device might not be able to otherwise access.

D. Power Systems

In a further aspect, the UDV 200 may include power system(s) 218. The power system 218 may include one or more batteries for providing power to the UDV 200. In one example, the one or more batteries may be rechargeable and each battery may be recharged via a wired connection between the battery and a power supply and/or via a wireless charging system, such as an inductive charging system that applies an external time-varying magnetic field to an internal battery.

E. Payloads

The UDV 200 may employ various systems and configurations in order to transport a payload 220. In some implementations, the payload 220 of a given UDV 200 may include or take the form of a "package" designed to transport various goods to a target delivery location. For example, the UDV 200 can include a compartment, in which an item or items may be transported. Such a package may one or more food items, purchased goods, medical items, or any other object(s) having a size and weight suitable to be transported between two locations by the UDV. In other embodiments, a payload 220 may simply be the one or more items that are being delivered (e.g., without any package housing the items).

In some embodiments, the payload 220 may be attached to the UDV and located substantially outside of the UDV during some or all of a travel path by the UDV. For example, the package may be tethered or otherwise releasably attached below an aerial UDV during flight to a target location. In an embodiment where a package carries goods below the aerial UDV, the package may include various features that protect its contents from the environment, reduce aerodynamic drag on the system, and prevent the contents of the package from shifting during aerial UDV flight.

For instance, when the payload 220 takes the form of a package for transporting items, the package may include an outer shell constructed of water-resistant cardboard, plastic, or any other lightweight and water-resistant material. Further, in order to reduce drag when transported by an aerial UDV, the package may feature smooth surfaces with a pointed front that reduces the frontal cross-sectional area. Further, the sides of the package may taper from a wide bottom to a narrow top, which allows the package to serve as a narrow pylon that reduces interference effects on the wing(s) of the UDV. This may move some of the frontal area and volume of the package away from the wing(s) of the UDV, thereby preventing the reduction of lift on the wing(s) cause by the package. Yet further, in some embodiments, the outer shell of the package may be constructed from a single sheet of material in order to reduce air gaps or extra material, both of which may increase drag on the system. Additionally or alternatively, the package may include a stabilizer to dampen package flutter. This reduction in flutter may allow the package to have a less rigid connection to the UDV and may cause the contents of the package to shift less during flight.

In order to deliver the payload, the aerial UDV may include a retractable delivery system that lowers the payload to the ground while the UDV hovers above. For instance, the UDV may include a tether that is coupled to the payload by a release mechanism. A winch can unwind and wind the tether to lower and raise the release mechanism. The release mechanism can be configured to secure the payload while being lowered from the UDV by the tether and release the payload upon reaching ground level. The release mechanism can then be retracted to the UDV by reeling in the tether using the winch.

In some implementations, the payload 220 may be passively released once it is lowered to the ground. For example, a passive release mechanism may include one or more swing arms adapted to retract into and extend from a housing. An extended swing arm may form a hook on which the payload 220 may be attached. Upon lowering the release mechanism and the payload 220 to the ground via a tether, a gravitational force as well as a downward inertial force on the release mechanism may cause the payload 220 to detach from the hook allowing the release mechanism to be raised upwards toward the aerial UDV. The release mechanism may further include a spring mechanism that biases the swing arm to retract into the housing when there are no other external forces on the swing arm. For instance, a spring may exert a force on the swing arm that pushes or pulls the swing arm toward the housing such that the swing arm retracts into the housing once the weight of the payload 220 no longer forces the swing arm to extend from the housing. Retracting the swing arm into the housing may reduce the likelihood of the release mechanism snagging the payload 220 or other nearby objects when raising the release mechanism toward the UDV upon delivery of the payload 220.

Active payload release mechanisms are also possible. For example, sensors such as a barometric pressure based altimeter and/or accelerometers may help to detect the position of the release mechanism (and the payload) relative to the ground. Data from the sensors can be communicated back to the aerial UDV and/or a control system over a wireless link and used to help in determining when the release mechanism has reached ground level (e.g., by detecting a measurement with the accelerometer that is characteristic of ground impact). In other examples, the aerial UDV may determine that the payload has reached the ground based on a weight sensor detecting a threshold low downward force on the tether and/or based on a threshold low measurement of power drawn by the winch when lowering the payload.

Other systems and techniques for delivering a payload, in addition or in the alternative to a tethered delivery system are also possible. For example, a UDV 200 could include an air-bag drop system or a parachute drop system. Alternatively, a UDV 200 carrying a payload could simply land on the ground at a delivery location. Other examples are also possible.

A ground-based UDV may include an articulated robotic arm that may be used to move the payload out of a storage compartment on the UDV and place the object at a target drop-off spot within the delivery destination.

IV. Example UDV Deployment Systems

Figure 3:
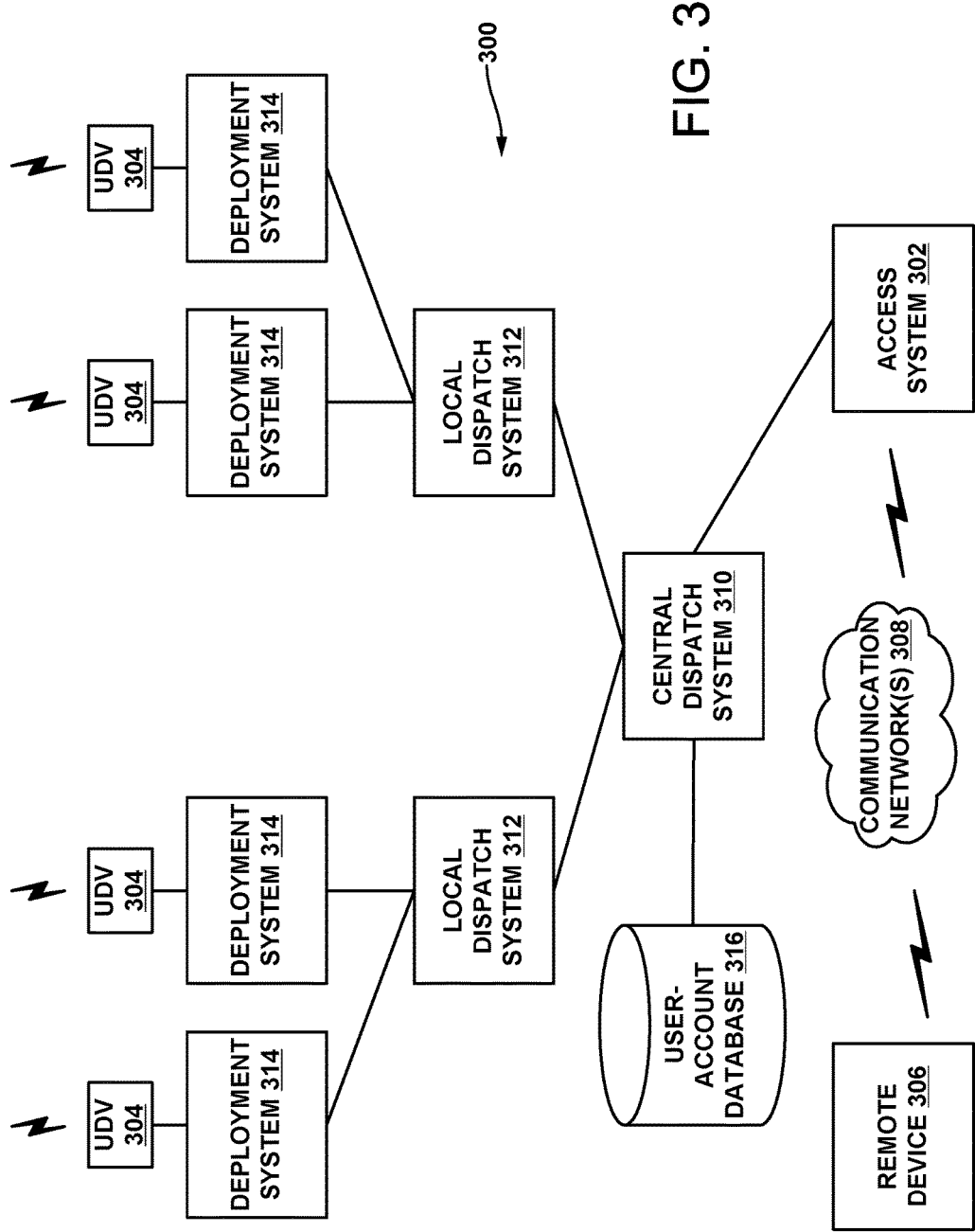
FIG. 3 is a simplified block diagram illustrating an unmanned delivery vehicle system, according to an example embodiment.

UDV systems may be implemented in order to provide various UDV-related services. In particular, UDVs may be provided at a number of different launch sites that may be in communication with regional and/or central control systems. Such a distributed UDV system may allow UDVs to be quickly deployed to provide services across a large geographic area (e.g., that is much larger than the travel range of any single UDV). For example, UDVs capable of carrying payloads may be distributed at a number of launch sites across a large geographic area (possibly even throughout an entire country, or even worldwide), in order to provide on-demand transport of various items to locations throughout the geographic area. FIG. 3 is a simplified block diagram illustrating a distributed UDV system 300, according to an example embodiment.

In the illustrative UDV system 300, an access system 302 may allow for interaction with, control of, and/or utilization of a network of UDVs 304. In some embodiments, an access system 302 may be a computing system that allows for human-controlled dispatch of UDVs 304. As such, the control system may include or otherwise provide a user interface through which a user can access and/or control the UDVs 304.

In some embodiments, dispatch of the UDVs 304 may additionally or alternatively be accomplished via one or more automated processes. For instance, the access system 302 may dispatch one of the UDVs 304 to transport a payload to a target location, and the UDV may autonomously navigate to the target location by utilizing various on-board sensors, such as a GPS receiver and/or other various navigational sensors.

Further, the access system 302 may provide for remote operation of a UDV. For instance, the access system 302 may allow an operator to control the flight of a UDV via its user interface. As a specific example, an operator may use the access system 302 to dispatch a UDV 304 to a delivery destination. The UDV 304 may then autonomously navigate to the general vicinity of the delivery destination. At this point, the operator may use the access system 302 to take control of the UDV 304 and navigate the UDV to a target spot within the delivery destination (e.g., a user-designated target drop-off spot for an ordered package). Other examples of remote operation of a UDV are also possible.

In an illustrative embodiment, the UDVs 304 may take various forms. For example, each of the UDVs 304 may be a UDV such as those illustrated in FIG. 1A-1E or 2. However, UDV system 300 may also utilize other types of UDVs without departing from the scope of the invention. In some implementations, all of the UDVs 304 may be of the same or a similar configuration. However, in other implementations, the UDVs 304 may include a number of different types of UDVs. For instance, the UDVs 304 may include a number of types of UDVs (e.g., ground UDVs, aerial UDVs, and water-based UDVs), with each type of UDV being configured for a different type or types of payload delivery capabilities.

The UDV system 300 may further include a remote device 306, which may take various forms. Generally, the remote device 306 may be any device through which a direct or indirect request to dispatch a UDV can be made. (Note that an indirect request may involve any communication that may be responded to by dispatching a UDV, such as requesting a package delivery). In an example embodiment, the remote device 306 may be a mobile phone, tablet computer, laptop computer, personal computer, or any network-connected computing device. Further, in some instances, the remote device 306 may not be a computing device. As an example, a standard telephone, which allows for communication via plain old telephone service (POTS), may serve as the remote device 306. Other types of remote devices are also possible.

Further, the remote device 306 may be configured to communicate with access system 302 via one or more types of communication network(s) 308. For example, the remote device 306 may communicate with the access system 302 (or a human operator of the access system 302) by communicating over a POTS network, a cellular network, and/or a data network such as the Internet. Other types of networks may also be utilized.

In some embodiments, the remote device 306 may be configured to allow a user to request delivery of one or more items to a desired location. For example, a user could request UDV delivery of a package to their home via their mobile phone, tablet, or laptop. As another example, a user could request dynamic delivery to wherever they are located at the time of delivery. To provide such dynamic delivery, the UDV system 300 may receive location information (e.g., GPS coordinates, etc.) from the user's mobile phone, or any other device on the user's person, such that a UDV can navigate to the user's location (as indicated by their mobile phone).

In an illustrative arrangement, the central dispatch system 310 may be a server or group of servers, which is configured to receive dispatch messages requests and/or dispatch instructions from the access system 302. Such dispatch messages may request or instruct the central dispatch system 310 to coordinate the deployment of UDVs to various target locations. The central dispatch system 310 may be further configured to route such requests or instructions to one or more local dispatch systems 312. To provide such functionality, the central dispatch system 310 may communicate with the access system 302 via a data network, such as the Internet or a private network that is established for communications between access systems and automated dispatch systems.

In the illustrated configuration, the central dispatch system 310 may be configured to coordinate the dispatch of UDVs 304 from a number of different local dispatch systems 312. As such, the central dispatch system 310 may keep track of which UDVs 304 are located at which local dispatch systems 312, which UDVs 304 are currently available for deployment, and/or which services or operations each of the UDVs 304 is configured for (in the event that a UDV fleet includes multiple types of UDVs configured for different services and/or operations). Additionally or alternatively, each local dispatch system 312 may be configured to track which of its associated UDVs 304 are currently available for deployment and/or are currently in the midst of item transport.

In some cases, when the central dispatch system 310 receives a request for UDV-related service (e.g., transport of an item) from the access system 302, the central dispatch system 310 may select a specific UDV 304 to dispatch. The central dispatch system 310 may accordingly instruct the local dispatch system 312 that is associated with the selected UDV to dispatch the selected UDV. The local dispatch system 312 may then operate its associated deployment system 314 to launch the selected UDV. In other cases, the central dispatch system 310 may forward a request for a UDV-related service to a local dispatch system 312 that is near the location where the support is requested and leave the selection of a particular UDV 304 to the local dispatch system 312.

In an example configuration, the local dispatch system 312 may be implemented as a computing system at the same location as the deployment system(s) 314 that it controls. For example, the local dispatch system 312 may be implemented by a computing system installed at a building, such as a warehouse, where the deployment system(s) 314 and UDV(s) 304 that are associated with the particular local dispatch system 312 are also located. In other embodiments, the local dispatch system 312 may be implemented at a location that is remote to its associated deployment system(s) 314 and UDV(s) 304.

Numerous variations on and alternatives to the illustrated configuration of the UDV system 300 are possible. For example, in some embodiments, a user of the remote device 306 could request delivery of a package directly from the central dispatch system 310. To do so, an application may be implemented on the remote device 306 that allows the user to provide information regarding a requested delivery, and generate and send a data message to request that the UDV system 300 provide the delivery. In such an embodiment, the central dispatch system 310 may include automated functionality to handle requests that are generated by such an application, evaluate such requests, and, if appropriate, coordinate with an appropriate local dispatch system 312 to deploy a UDV.

Further, some or all of the functionality that is attributed herein to the central dispatch system 310, the local dispatch system(s) 312, the access system 302, and/or the deployment system(s) 314 may be combined in a single system, implemented in a more complex system, and/or redistributed among the central dispatch system 310, the local dispatch system(s) 312, the access system 302, and/or the deployment system(s) 314 in various ways.

Yet further, while each local dispatch system 312 is shown as having two associated deployment systems 314, a given local dispatch system 312 may alternatively have more or fewer associated deployment systems 314. Similarly, while the central dispatch system 310 is shown as being in communication with two local dispatch systems 312, the central dispatch system 310 may alternatively be in communication with more or fewer local dispatch systems 312.

In a further aspect, the deployment systems 314 may take various forms. In general, the deployment systems 314 may take the form of or include systems for physically launching one or more of the UDVs 304. Such launch systems may include features that provide for an automated UDV launch and/or features that allow for a human-assisted UDV launch. Further, the deployment systems 314 may each be configured to launch one particular UDV 304, or to launch multiple UDVs 304.

The deployment systems 314 may further be configured to provide additional functions, including for example, diagnostic-related functions such as verifying system functionality of the UDV, verifying functionality of devices that are housed within a UDV (e.g., a payload delivery apparatus), and/or maintaining devices or other items that are housed in the UDV (e.g., by monitoring a status of a payload such as its temperature, weight, etc.).

In some embodiments, the deployment systems 314 and their corresponding UDVs 304 (and possibly associated local dispatch systems 312) may be strategically distributed throughout an area such as a city. For example, the deployment systems 314 may be strategically distributed such that each deployment system 314 is proximate to one or more payload pickup locations (e.g., near a restaurant, store, or warehouse). However, the deployment systems 314 (and possibly the local dispatch systems 312) may be distributed in other ways, depending upon the particular implementation. As an additional example, kiosks that allow users to transport packages via UDVs may be installed in various locations. Such kiosks may include UDV launch systems, and may allow a user to provide their package for loading onto a UDV and pay for UDV shipping services, among other possibilities. Other examples are also possible.

In a further aspect, the UDV system 300 may include or have access to a user-account database 316. The user-account database 316 may include data for a number of user accounts, and which are each associated with one or more person. For a given user account, the user-account database 316 may include data related to or useful in providing UDV-related services. Typically, the user data associated with each user account is optionally provided by an associated user and/or is collected with the associated user's permission.

Further, in some embodiments, a person may be required to register for a user account with the UDV system 300, if they wish to be provided with UDV-related services by the UDVs 304 from UDV system 300. As such, the user-account database 316 may include authorization information for a given user account (e.g., a username and password), and/or other information that may be used to authorize access to a user account.

In some embodiments, a person may associate one or more of their devices with their user account, such that they can access the services of UDV system 300. For example, when a person uses an associated mobile phone to, e.g., place a call to an operator of the access system 302 or send a message requesting a UDV-related service to a dispatch system, the phone may be identified via a unique device identification number, and the call or message may then be attributed to the associated user account. Other examples are also possible.

V. Example Object Delivery Operations

Figure 4:
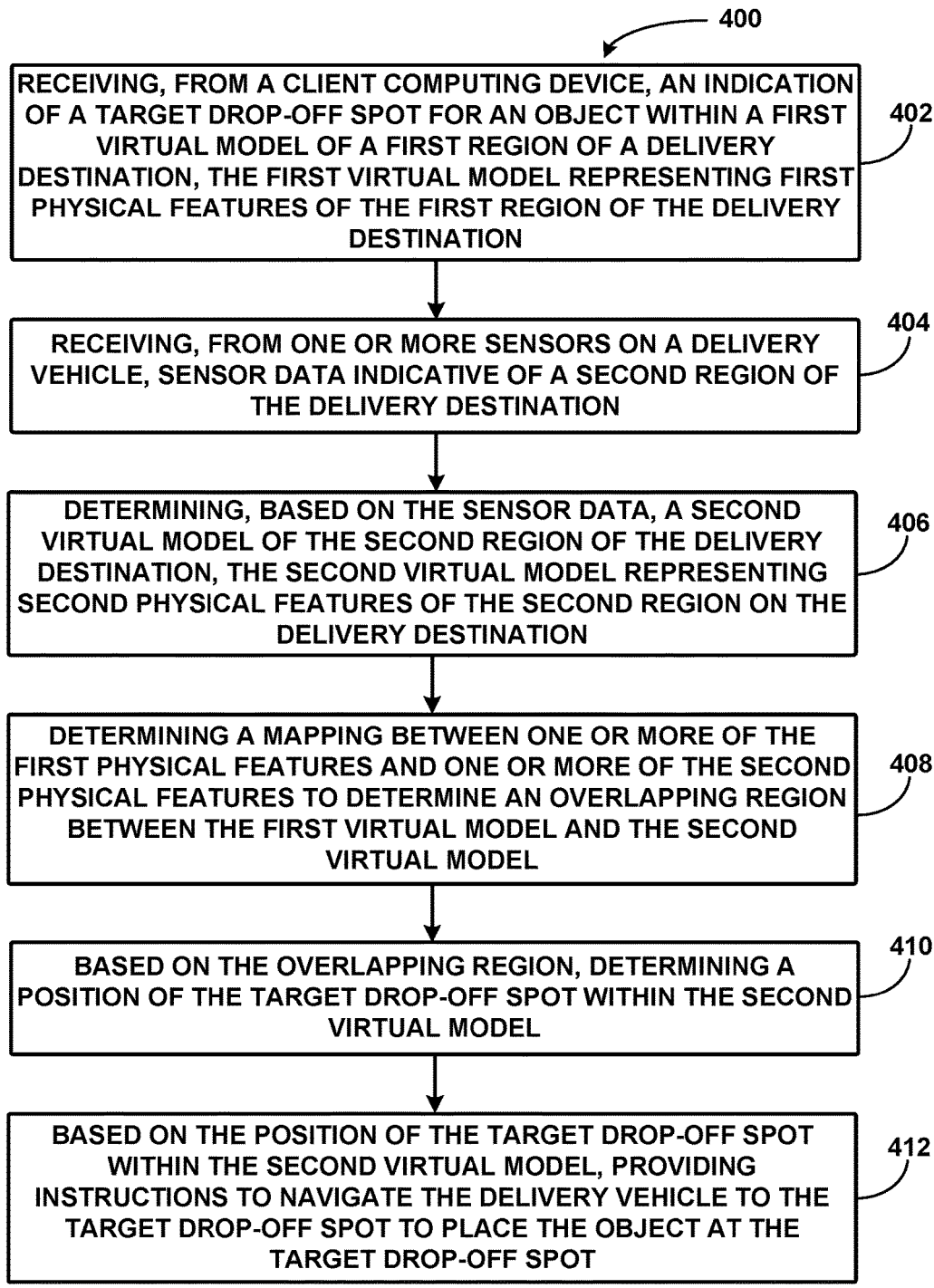
FIG. 4 illustrates an example flow diagram, according to an example embodiment.

FIG. 4 illustrates a flow diagram 400 of operations that may be performed by one or more computing devices within a delivery system (e.g., UDV system) to deliver an object (e.g., package) to a target drop-off spot within a delivery destination. In one example, the operations of flow diagram 400 may be performed by a server device in communication with a delivery vehicle and a client computing device. Alternatively, a control system of the delivery vehicle may be configured to perform the operations of flow diagram 400. In some embodiments, the operations of flow diagram 400 may be distributed between one or more server devices, one or more delivery vehicles, and one or more client computing devices. The manner in which the operations are divided may be based on a communication bandwidth associated with the operations herein described.

Within examples, a delivery destination may be a geographic location to which delivery of an object is requested. The delivery destination may be, for example, a residence of a user requesting delivery of the object. In other examples, the delivery destination may be the user's work, a residence belonging to the user's relatives, a current location of the user, or a future location of the user, among other possibilities. Additionally, within examples, a target drop-off spot may be an area within the delivery destination at which a delivery vehicle is requested and/or expected to place the object upon delivery of the object to the delivery destination. The area of the target drop-off spot may be a subset of the area of the delivery destination. The target drop-off spot may be designated by the user to have the package placed in a spot that the user regards as safe and/or convenient.

In block 402, an indication of a target drop-off spot for an object may be received from a client computing device. The indication may represent a spot within a first virtual model of a first region of a delivery destination. The first virtual model may represent first physical features of the first region of the delivery destination. Within examples, the physical features may include topological features, vegetation, buildings, architectural and/or structural features of buildings, and other objects contained in, adjacent to, or observable from a region of the delivery destination. The object may be contained in a box or other package to be delivered by an autonomous delivery vehicle to the delivery destination.

The first virtual model may be generated based on sensor data received from one or more sensors on or connected to the client computing device. For example, a user may capture a plurality of images of the first region of the delivery destination using a camera on the client computing device. Each image may be associated with additional sensor data from one or more additional sensors on the client computing device such as, for example, GPS module, magnetometers, gyroscopes, and accelerometers. The client computing device may transmit the images, along with the additional sensor data, to a remote server that may generate the first virtual model based on the images and the additional sensor data. Alternatively, the client computing device may be configured to generate the first virtual model locally.

The first virtual model may then be displayed by way of a user interface of the client computing device. The client computing device may prompt for designation of a target drop-off spot within the first virtual model. User designation of the target drop-off spot may be received by way of the user interface. Specifically, the user may use gestures (e.g., touching, clicking, scrolling, etc.) to place a virtual "bullseye" marker within the displayed virtual model to designate the target drop-off spot. Thus, a user may select a spot that the user deems appropriate or safe for package delivery. For example, a user may designate that packages be placed next to the front door of the user's residence in a spot where the packages will not block the front door. Similarly, the user may designate to have packages placed in a backyard of the user's residence, behind a locked gate, as opposed to in the front of the user's residence.

Once indication of the target drop-off spot for the object is received, an unmanned delivery vehicle may be dispatched to deliver the object to the delivery location. The delivery vehicle may navigate to within a threshold distance (e.g., within several meters) of the delivery destination based on GPS coordinates of the delivery destination. In order to locate the delivery destination and, more specifically, the target drop-off spot within the delivery destination, the delivery vehicle may rely on additional, non-GPS sensor data after coming within the threshold distance of the delivery destination.

Accordingly, in block 404, sensor data may be received from one or more sensors on the delivery vehicle. The sensor data may be indicative of a second region of the delivery destination. The sensors may include a camera, a stereo camera, a depth sensor, LIDAR, accelerometers, magnetometers, and gyroscopes, among other possibilities. In some embodiments, the delivery vehicle may include all of the sensors included on the client computing device from which sensor data was captured to generate the first virtual model. Accordingly, sensor readings across multiple sensors of the delivery vehicle may be compared to sensor readings from sensors of the same types on the client computing device. Comparing sensor data across multiple sensors may allow for a more efficient scanning of the delivery destination. For example, based on the magnetometer readings, the delivery vehicle may, while scanning the delivery destination, orient itself in the same direction as the client computing device at the time of data acquisition for the first virtual model, thus increasing the probability of scanning the same region of the delivery destination.

In block 406, a second virtual model of the second region of the delivery destination may be determined based on the sensor data. The second virtual model may represent second physical features of the second region of the delivery destination. As with the first virtual model, the physical features represented by the second virtual model may include topological features, vegetation, buildings, and other objects contained in, adjacent to, or observable from the second region of the delivery destination. The second virtual model, as well as the first virtual model, may be a three dimensional (3D) model such as a point cloud, wireframe model, surface model, or solid model. Alternatively, the model may be two dimensional and may include depth information. Further, in some embodiments, the model may be a collection of multiple images representing the delivery destination.

In block 408, a mapping may be determined between one or more of the first physical features and one or more of the second physical features. In particular, the mapping may be between physical features represented in both virtual models. The mapping may be used to determine an overlapping region between the first virtual model and the second virtual model. In other words, the mapping may spatially synchronize the delivery vehicle's perception of the environment with the first virtual model to locate the target drop-off spot within the second virtual model. Determining the mapping may include determining a geometric transformation between the one or more of the first physical features and the one or more of the second physical features. In some embodiments, the operations of blocks 404, 406, and 408 may be iterated until an overlapping region is found. Specifically, the second virtual model may be expanded based on additional sensor data until a mapping with a sufficiently high confidence level is found between the first and second virtual models.

In block 410, a position of the target drop-off spot within the second virtual model may be determined based on the overlapping region. In particular, if the region of the delivery destination containing the target drop-off spot is not already represented by the second virtual model, the delivery vehicle may acquire additional sensor data representing the region of the delivery destination containing the target drop-off spot. The determined geometric transformation may be applied to coordinates of the target drop-off spot within the first virtual model to determine coordinates of the target drop-off spot within the second virtual model. Thus, a position of the target drop-off spot may be determined within the delivery vehicle's perception of the delivery destination.

In block 412, based on the position of the target drop-off spot within the second virtual model, instructions may be provided to navigate the delivery vehicle to the target drop-off spot to place the object at the target drop-off spot. In one example, machine learning algorithms may be utilized to plan the path through which to navigate the vehicle to the target drop-off spot to avoid obstacles, hazards, and/or other environmental features within the delivery destination.

VI. Example Target Drop-off Spot Designation Operations

Figure 5:
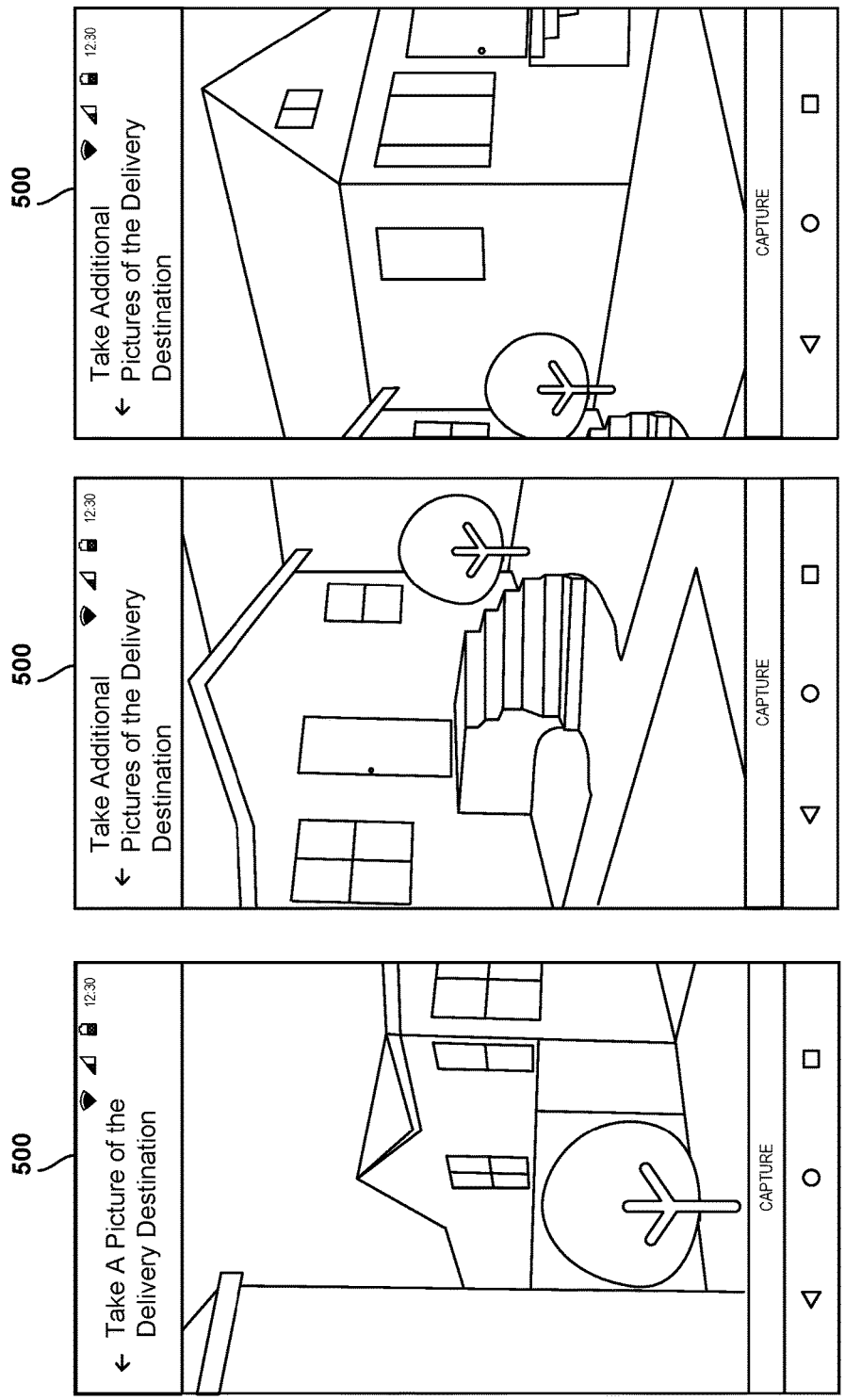
FIGS. 5A, 5B, and 5C illustrate a client computing device capturing sensor data representing a delivery destination, according to an example embodiment.

FIGS. 5A, 5B, and 5C illustrate example implementations for generating a first virtual model of a first region of a delivery destination. The first virtual model may be generated based on sensor data from a client computing device used to order a package and request delivery of the package to a target drop-off spot within the delivery destination. The first virtual model may be generated to allow the target drop-off spot to be designated within the delivery destination by way of a user interface of the client computing device. The first virtual model may additionally serve as a point of reference for the delivery vehicle. Namely, the delivery vehicle may compare a second virtual model, generated based on sensor data captured by the delivery vehicle, to the first virtual model to localize the delivery vehicle with respect to the target drop-off spot.

In one example, client computing device 500 (e.g., a smartphone) may prompt, by way of a user interface, to take a picture of a region of the delivery destination (e.g., front yard of a home, backyard, balcony, camping ground, etc.) where the user desires to have one or more packages delivered and dropped off, as shown in FIG. 5A. Computing device 500 may further prompt for additional images to be taken of the delivery destination, as shown in FIGS. 5B and 5C, based on which a more complete model may be generated. In response to the prompts, a user may pan the camera of the computing device to capture additional images of the region within the delivery destination where the user desires to have the packages dropped off. In some embodiments, the client computing device may capture a continuous video instead of discrete images. Accordingly, the computing device may prompt to pan the camera over the desired region of the delivery destination.

As successive images are captured, either discretely or from a video stream, the images may be used to construct the first virtual model of the first region of the delivery destination represented by the images. In some embodiments, the images may be transmitted to a remote computing device configured to generate the virtual model from the images. Alternatively, the client computing device may be configured to generate the model from the images locally.

Each image may be associated with a plurality of additional sensor data acquired by the client computing device at the time of image capture, such as magnetometer, gyroscope, and accelerometer readings that may aid in determining a position and orientation from which the respective image was captured. The images, along with the corresponding additional sensor data, may be used to generate a model of the region of the delivery destination represented by the images. The model may be three dimensional (3D) such as, for example, a point cloud model, a wireframe model, a shell model, or a solid model, among other possibilities. Alternatively, in some embodiments, the model may be two dimensional (2D) and may include a depth map. Further, the model may be a collection of multiple images, each associated with corresponding additional sensor data. Yet further, in some embodiments, the model may include all of the above mentioned model types. Accordingly, the effects of errors and artifacts of each modeling technique on the mapping determined between the first and second virtual models may be reduced or minimized by finding multiple mappings, each based on a different model type.

While the model is being constructed, the client computing device may prompt the user to pan the camera over a portion of the first region of the delivery destination for which additional sensor data may be needed to construct an accurate model. Alternatively or additionally, the computing device may prompt the user to walk to a different location to acquire sensor data from a different perspective, position, and/or orientation. The prompts make take the form of text and/or arrows indicating in which direction to move or pan the client computing device to acquire the additional sensor data. In some embodiments, the client computing device may display a real-time visualization or simulation of the model generation process. For example, as the virtual model is built up, physical features displayed on the user interface (e.g., in the full-screen viewfinder of the client computing device) may be replaced by virtual representations of the respective features to provide the user with feedback. Based on the feedback, the user may pan the camera over portions of the environment that have not been replaced with virtual representations.

Figure 6:
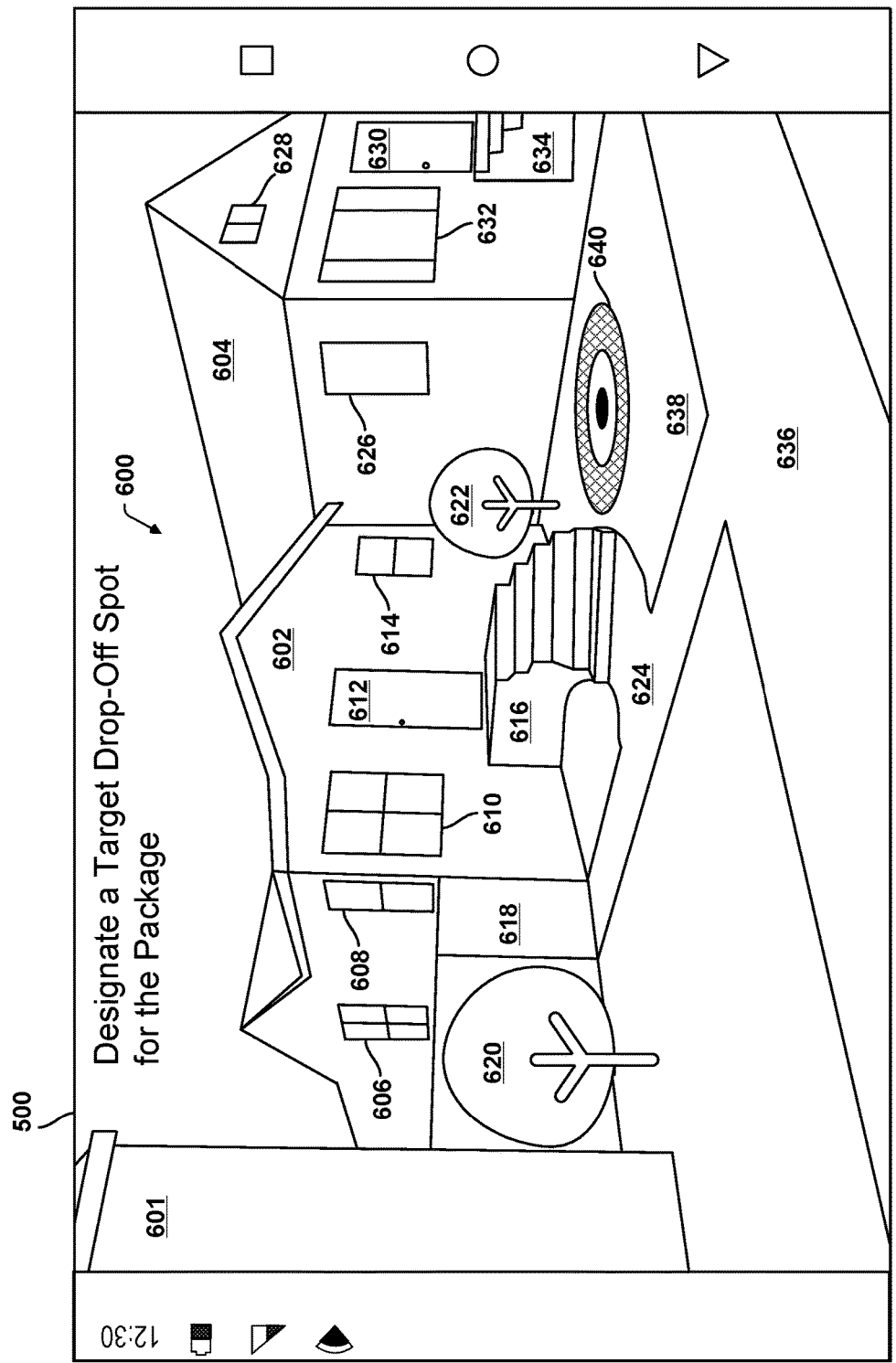
FIG. 6 illustrates an example designation of a target drop-off spot within an example virtual model of a delivery destination, according to an example embodiment.

When the first virtual model 600 of the first region of the delivery destination is complete, the model may be displayed by way of the user interface of the client computing device 500, as illustrated in FIG. 6. The first virtual model 600 may include virtual representations of a plurality of physical features within the first region of the delivery destination (e.g., delivery destination house 602, neighboring houses 601 and 604, windows 606, 608, 610, 614, 626, 628, and 632, doors 612 and 630, vegetation 620 and 622, gate 618, stairs 616 and 634, walkway 624, and sidewalk 636). In some embodiments, the virtual model may represent the physical features as point clouds, wireframes, surfaces, and/or solids. Alternatively, the underlying virtual structures may be hidden from the user (but may nevertheless form parts of the model). Instead, the computing device might display one or more of the captured images to provide the user with a more intuitive representation of the model.

The client computing device may prompt for designation of a target drop-off spot for an object within the delivery destination. A user may be able to indicate a desired target drop-off spot by tapping on a region of the displayed virtual model 600 to place a virtual "bullseye" marker 640 at that location. For example, the user may tap in region 638 to place bullseye 640 in region 638. Upon delivery, the requested object will be placed by the delivery vehicle within the center of bullseye 640.

In some embodiments, the virtual model 600 may be navigable by way of input through the user interface to allow the perspective or orientation from which the model is displayed to be changed. Navigation through the virtual model 600 may allow the target drop-off spot to be selected with greater accuracy. In some examples, the size of bullseye 640 may be proportional to a size of the object ordered for delivery and/or may resemble a shape of the object (e.g., the bullseye may be rectangular when the requested object is packed in a rectangular box). The dynamic bullseye size and shape may aid in determining whether a designated target drop-off spot within the delivery destination is suitable to receive the requested object.

Additionally or alternatively, once the bullseye target is designated within the virtual model, the system may determine whether the designated target drop-off spot is appropriate for the size of object requested as well as whether the delivery vehicle will be able to reach the target drop-off spot. For example, a ground-based delivery vehicle might be unable to deliver to a target drop-off spot that can only be reached by traversing stairs. An aerial vehicle might be unable to deliver to a target drop-off spot that does not provide sufficient aerial clearance.

In some instances, the user may omit capturing images to determine a virtual model of a portion of the delivery destination. In particular, virtual models may already be available of portions of the delivery destination to which the user is requesting delivery of the object. Thus, a computing device may display the available virtual models to allow for designation of a target drop-off spot within a virtual model or selection of a target drop-off spot from one or more previously designated target drop-off spots. Further, in some embodiments, the client computing device may prompt the user to designate one or more additional "backup" target drop-off locations. The package may be placed in the backup target drop-off location when the primary target drop-off location is already occupied by a package or obstacle or when the primary target drop-off spot cannot be located or reached by the delivery vehicle.

VII. Example Delivery Vehicle Guidance Operations

In response to a request for object/package delivery, a delivery service may dispatch (e.g., by way of UDV system 300) a delivery vehicle with the requested object to the delivery destination. The delivery vehicle may navigate from its current location (e.g., a warehouse storing the requested object) to the delivery destination based primarily on GPS information.

In planning the path or trajectory to the delivery destination, the control system of the delivery vehicle may consider information represented by the first virtual model. For example, the control system may determine that the client computing device was pointed north when sensor data used to generate the first virtual model was captured. Accordingly, in order to increase or maximize the probability of locating and observing, by sensors on the delivery vehicle, the region represented by the first virtual model, the delivery vehicle may approach the delivery destination from the south, moving in a northerly direction. In some instances, the northerly approach may naturally result from the relative geographic location between the origination location of the object and the delivery destination (e.g., delivery destination lies north of the origination location). Alternatively, the path or trajectory may be planned to navigate the vehicle past the delivery destination (e.g., south of the delivery destination) and subsequently approach the delivery destination from the desired direction (e.g., northerly approach).

Figure 7A:
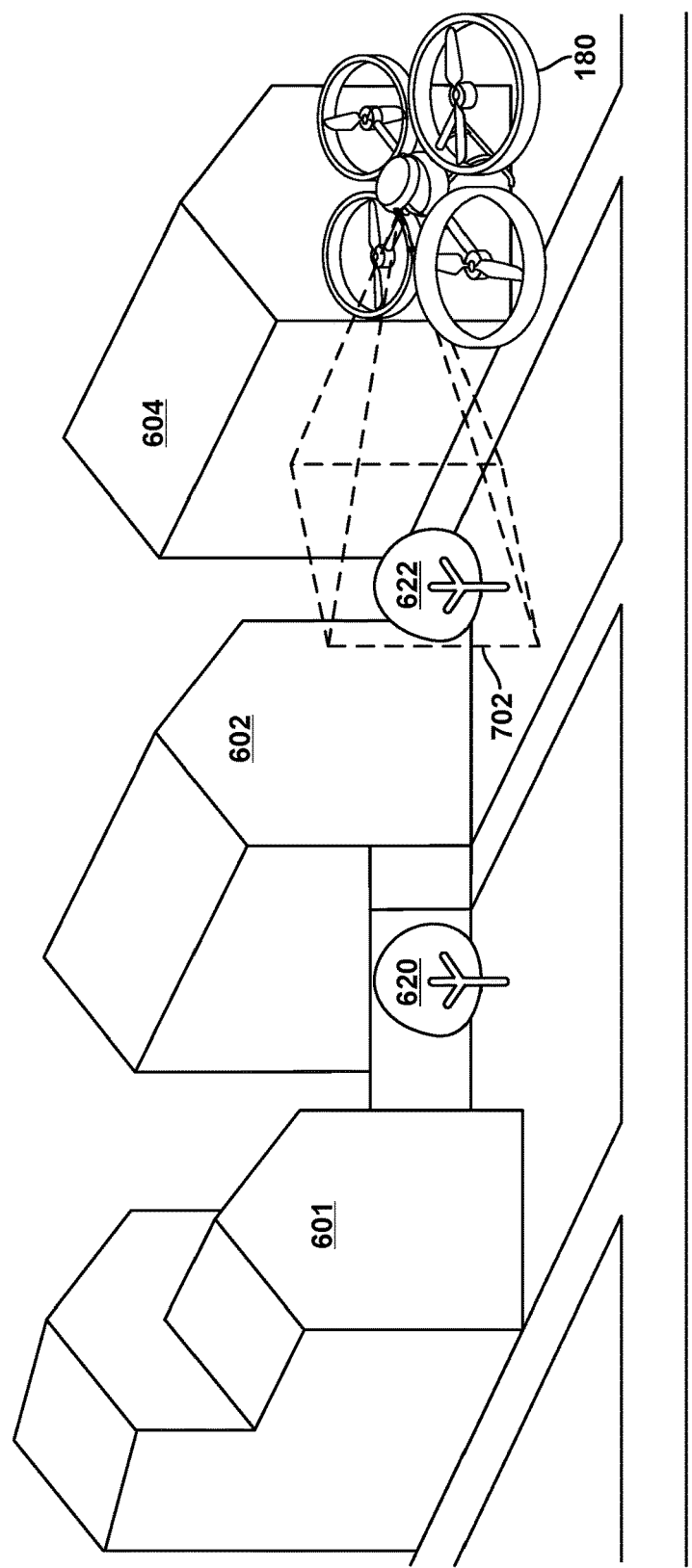
FIG. 7A illustrates a delivery vehicle scanning a delivery destination, according to an example embodiment.

Upon arriving within a threshold distance of the delivery destination (e.g., within a horizontal and/or vertical accuracy limit of the GPS system), the control system may begin capturing data from sensors on the delivery vehicle for localization and navigation of the vehicle to the target drop-off spot for the object, as illustrated in FIG. 7A. In particular, FIG. 7A illustrates aerial UDV 180 capturing sensor data representing a portion of delivery destination 602. Aerial UDV 180 may hover about, pan the camera on the UDV, or a combination thereof to sweep the sensor field of view 702 over the delivery destination to acquire sensor data representing a region of the delivery destination (e.g., the front of the house 602). The sensor data from the delivery vehicle may be captured from a different position and/or a different orientation than that of the client computing device used to generate the first virtual model. For example, aerial UDV 180 may capture the sensor data from a greater height than the client computing device while a ground UDV may capture the sensor data from a lesser height than the client computing device. The horizontal perspective of the sensor data captured by the delivery vehicle may equally differ from that of the first virtual model.

Once sensor data is captured, a second virtual model 700 may be generated based on the sensor data, as illustrated in FIG. 7B. The second virtual model may reflect the perspective from which the sensor data has been captured. In particular, due to the different perspective, the second virtual model may include representations of windows 642, 644, and 646 that are not included in the first virtual model. Additionally, the second virtual model may lack, due to the different perspective, representations of windows 606, 608, 626, 628, and 632, door 630, and stairs 634. In some embodiments, the model may include perspective distortion. Namely, the perspective from which the sensor data is captured may be reflected in the shapes and relative sizes of the various physical features represented in the virtual model (i.e., physical features closer to the camera may appear larger than physical features further away from the camera). The type of model used to represent the delivery destination (e.g., 3D vs. 2D with depth vs. simple images) may additionally influence the extent to which the virtual representations of the physical features reflect the perspective from which the physical objects have been observed. For example, a 3D model might be free of perspective distortion.

Figure 8A:
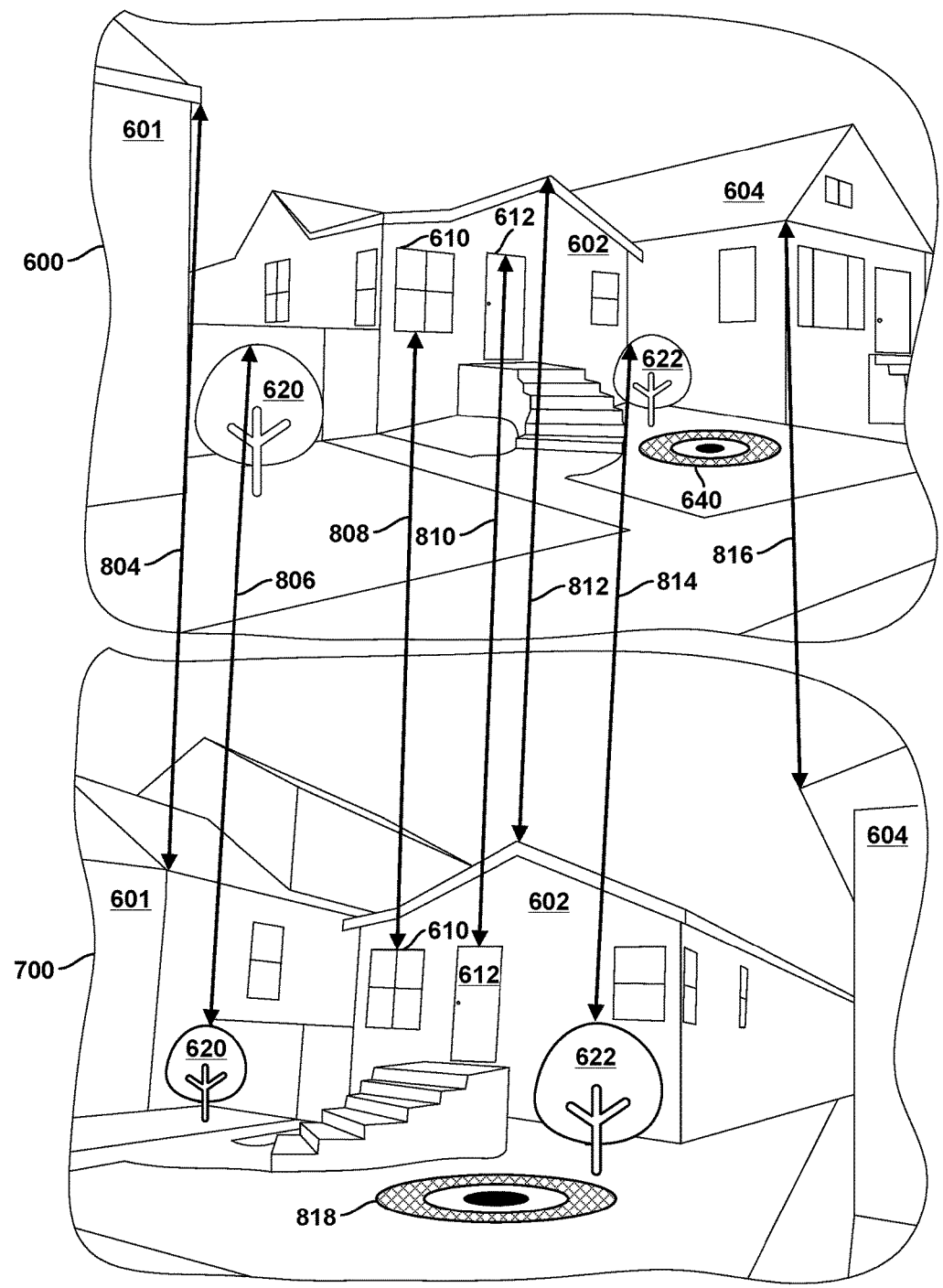
FIG. 8A illustrates an example mapping between two virtual models, according to an example embodiment.

A mapping may be determined between the first model 600 and the second model 700 to determine an overlapping region between the first and second models, as illustrated in FIG. 8A. In some example embodiments, the mapping may be determined by directly comparing model 700 to model 600. In particular, the system may determine a mapping between one or more of first physical features represented in the first virtual model 600 and one or more of second physical features represented in the second virtual model 700. Determining the mapping may be carried out in two steps. First, the system may determine physical features that are common between the first virtual model and the second virtual model. For example, house 601, house 602, house 604, vegetation 620 and 622, windows 610 and 614, and door 612 are represented in both the first model 600 and the second model 700. In contrast, windows 606 and 608 are represented only in model 600 while windows 644 and 646 are represented only in model 700. Thus, some physical features might be represented in only one of the models and a mapping between these features might not be possible.

Determining the mapping may further include determining a geometric transformation between features represented in the first model and features represented in the second model to establish a spatial relationship between the two models. For example, the geometric transformation may be represented as a matrix. In some embodiments, one transformation may be sufficient to map representations of the physical features between the two models. Alternatively or additionally, each respective physical feature may be associated with an individual transformation that maps the representation of the respective feature in the first model to the representation of the respective feature in the second model.

In FIG. 8A, lines 804, 806, 808, 810, 812, 814, and 816 indicate example mappings of representations of physical objects between the first virtual model 600 and the second virtual model 700. Specifically, line 804 represents a mapping between representations of roof corner of neighboring house 601, line 806 represents a mapping between representations of vegetation 620, line 808 represents a mapping between representations of window 610, line 810 represents a mapping between representations of door 612, line 812 represents a mapping between representations of roof peak of the house 602 (e.g., house associated with or representing the delivery destination), line 814 represents a mapping between representations of vegetation 622, and line 816 represents a mapping between representations of roof corner of neighboring house 604. Each of lines 804-816 may be associated with an individual transformation (e.g., a transformation matrix) specific to the respective feature indicating the mapping. Alternatively or additionally, the mapping may be represented by a single global transformation between models 600 and 700.

The mapping between two models may be carried out using algorithms such as, for example, Random Sample Consensus (RANSAC), Least Median Squares estimation, Iterative Closest Point, Robust Point Matching, Kernel Correlation, and/or Coherent Point Drift, among other possibilities. Additionally or alternatively, the mapping may utilize machine learning algorithms to improve the mapping accuracy and reliability. For example, a decision tree, support vector machine, or Bayesian algorithm may be used to group representations of physical features within a virtual model into categories (e.g., vegetation, doors, windows, stairs, sidewalks, roadways, etc.). Accordingly, the system may only try to map a particular feature within the second model to features in the first model having the same class (e.g., try to map a window to other windows but not to doors or vegetation). In determining the mapping, the system may account for variations caused by time of day, weather, seasons (e.g., leaves or snow), changes in appearance of structures in the delivery location (e.g., house painted a different color since the first model was generated) as well as additional or missing objects at the delivery location (e.g., fallen branches, rearranged patio furniture, etc.).

The mapping may be used to determine an overlapping region between the first and second models. The overlap may be a geometric intersection between a portion of the second virtual model and a corresponding portion of the first virtual model. In particular, the extent to which the second representations of physical features in second model 700 correspond or map to representations of first physical features in first model 600 may determine whether second model 700 and first model 600 represent any common regions of the delivery destination.

For example, if the delivery vehicle initially scans a region adjacent to the wrong house due to inaccuracies in vehicle positioning based on GPS data, the system may determine that the mapping between the first model and the second model is weak or cannot be determined. In particular, a first portion of the second virtual model may be determined based on the initial sensor data. The first portion may represent physical features of a first sub-region of the second region of the delivery destination. The system may determine that the first portion of the second virtual model does not overlap with the first virtual model by determining that a confidence level of a mapping between the physical features represented in the first portion of the second virtual model and the first physical features is below a threshold confidence value. In other words, physical features within the first model do not correspond spatially to physical features within the first portion of the second model (e.g., the neighboring house may have a door and windows but the spatial relationship between the doors and windows does not match that of the first virtual model).

In response to determining that the confidence level of the mapping is below the threshold confidence value, the delivery vehicle may collect additional sensor data indicative of a second-sub region of the second region of the delivery destination. A second portion of the second virtual model may be determined based on the additional sensor data. The second portion may represent physical features of the second sub-region of the second region of the delivery destination. A mapping may be determined between one or more of the first physical features and one or more of the physical features of the second sub-region to determine the overlapping region between the first virtual model and the second portion of the second virtual model. Additionally, the system may determine that a confidence level of the mapping between the one or more of the first physical features and the one or more of the physical features of the second sub-region is greater than the threshold confidence value.

In some instances, an overlapping region may be determined between the first virtual model and the second virtual model. However, the overlapping region might not contain the target drop-off spot. Accordingly, determining the position of the target drop-off spot within the second virtual model may include determining, based on the overlapping region, a path through which to move the delivery vehicle to collect additional sensor data indicative of a region of the delivery destination containing the target drop-off spot. In response, instructions may be provided to navigate the delivery vehicle along the determined path and collect the additional sensor data while navigating along the determined path. Further, the second virtual model may be updated based on the additional sensor data to represent the target drop-off spot and physical features of the region of the delivery destination containing the target drop-off spot.

The operations of building-up the second virtual model and determining a mapping between the first and second models may be repeated until the delivery vehicle identifies a region of the delivery destination that matches the region represented by the first virtual model (i.e., until the overlapping region is identified). In other words, the delivery vehicle may search the general vicinity of the delivery destination until the region specified by the client computing device is found. The mapping operations may provide an objective metric for determining whether the region specified by the package recipient has been located. The operations of sensor data collection, model generation, and mapping may proceed sequentially or in parallel and may be carried out locally, by a control system of the delivery vehicle, or remotely, by a server device.

Once an overlapping region is identified, the overlapping region may be used to determine a position of the target drop-off spot 818 in the second virtual model 700. Specifically, determining the mapping may include determining a geometric transformation between representations of the one or more of the first physical features and representations of the one or more of the second physical features. Determining the position of target drop-off spot 818 in the second virtual model 700 may include applying the determined geometric transform to coordinates of the target drop-off spot within the first virtual model to determine coordinates of the target drop-off spot within the second virtual model. By determining the position of the target drop-off spot within the second virtual model, the control system may determine a spatial relationship between the delivery vehicle and the target drop-off spot within the delivery vehicle's perception of the delivery destination (e.g., within the delivery vehicle's coordinate system).

Figure 8B:
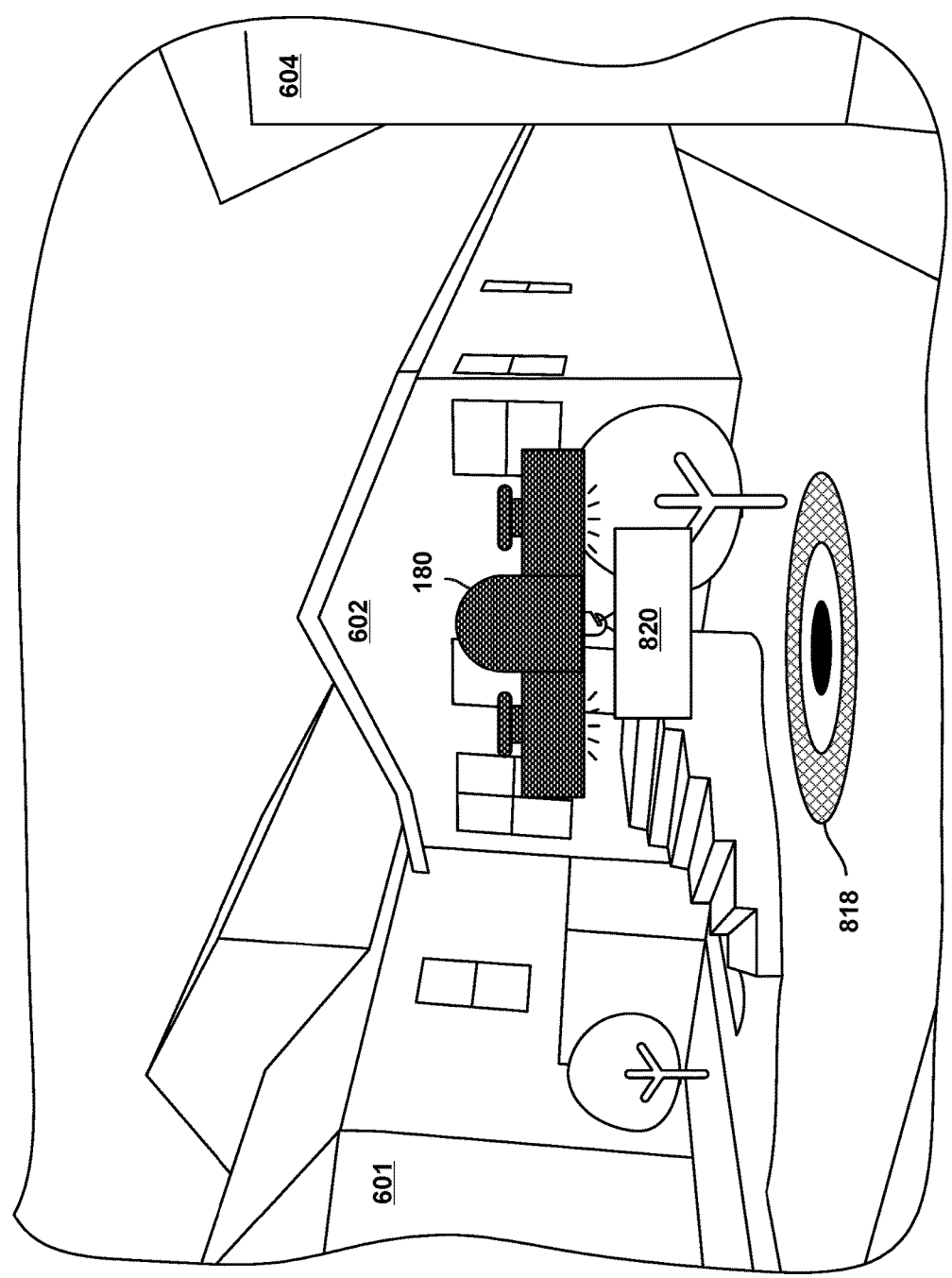
FIG. 8B illustrates delivery of an object by a delivery vehicle to a target drop-off spot within a delivery destination, according to an example embodiment.

Accordingly, the delivery vehicle may navigate to the target drop-off spot to place the object at the target drop-off spot based on the determined spatial relationship between the delivery vehicle and the target drop-off location, as illustrated in FIG. 8B. In particular, FIG. 8B illustrates aerial UDV 180 hovering above target drop-off spot 818 before placing package 820 down at the target drop-off spot 820. Thus, package 820 is placed in the target drop-off spot specified by the package recipient.

In some examples, after placing the object at the target drop-off spot, the delivery vehicle may capture image data (e.g., photo or video) showing the object successfully disposed at the target drop-off spot. The image data representing the object disposed at the target drop-off spot may be received and stored by a remote server within the delivery system as proof of delivery. A delivery confirmation may be transmitted to the client computing device. The delivery confirmation may include the image data representing the object disposed at the target drop-off spot. Further, in some embodiments, the delivery vehicle may additionally capture a video while the delivery vehicle is placing the object at the target drop-off spot. The video may be transmitted to and stored by the remote server and may be included in the delivery confirmation. In some examples, the video may be streamed live to the client computing device while the delivery vehicle is placing the object at the target drop-off spot. The client computing device may be used to aid in navigation of the delivery vehicle by tapping or otherwise indicating regions of the delivery destination to which the vehicle should navigate to find the target drop-off spot.

In some embodiments, the delivery vehicle may include the same sensors as the client computing device used to gather the sensor data based on which the first virtual model is generated. For example, the client computing device and the vehicle may each include a camera, gyroscopes, accelerometers, magnetometers, and a GPS unit, among other possibilities. Accordingly, the first virtual model and the second virtual model (i.e., model generated based on sensor data from the delivery vehicle) may each be based on sensor data from the same sensor types. Thus, when the system searches for overlap between the first and second models, the system may consider not only the determined models but also the underlying raw data from which the models were generated (e.g., the direction from which the image data was captured).

Notably, the operations herein described do not rely on any landing beacons, fiducial markers, or other physical markers that serve as localization points for the delivery vehicle. Instead, navigation of the delivery vehicle to the target drop-off spot relies on detection of features already present within the environment of the delivery destination. Thus, package delivery may easily be requested to locations not equipped with landing beacons or specialized landing markers. For example, a use may request and receive a package while at a location other than the user's home such as a park or camping ground. In particular, the systems and operations herein described may extend package delivery services to geographic regions not currently served by existing package delivery services due to lack of roads and/or organized street addresses, among other reasons.

VIII. Additional Example Mapping Operations

Figure 9:
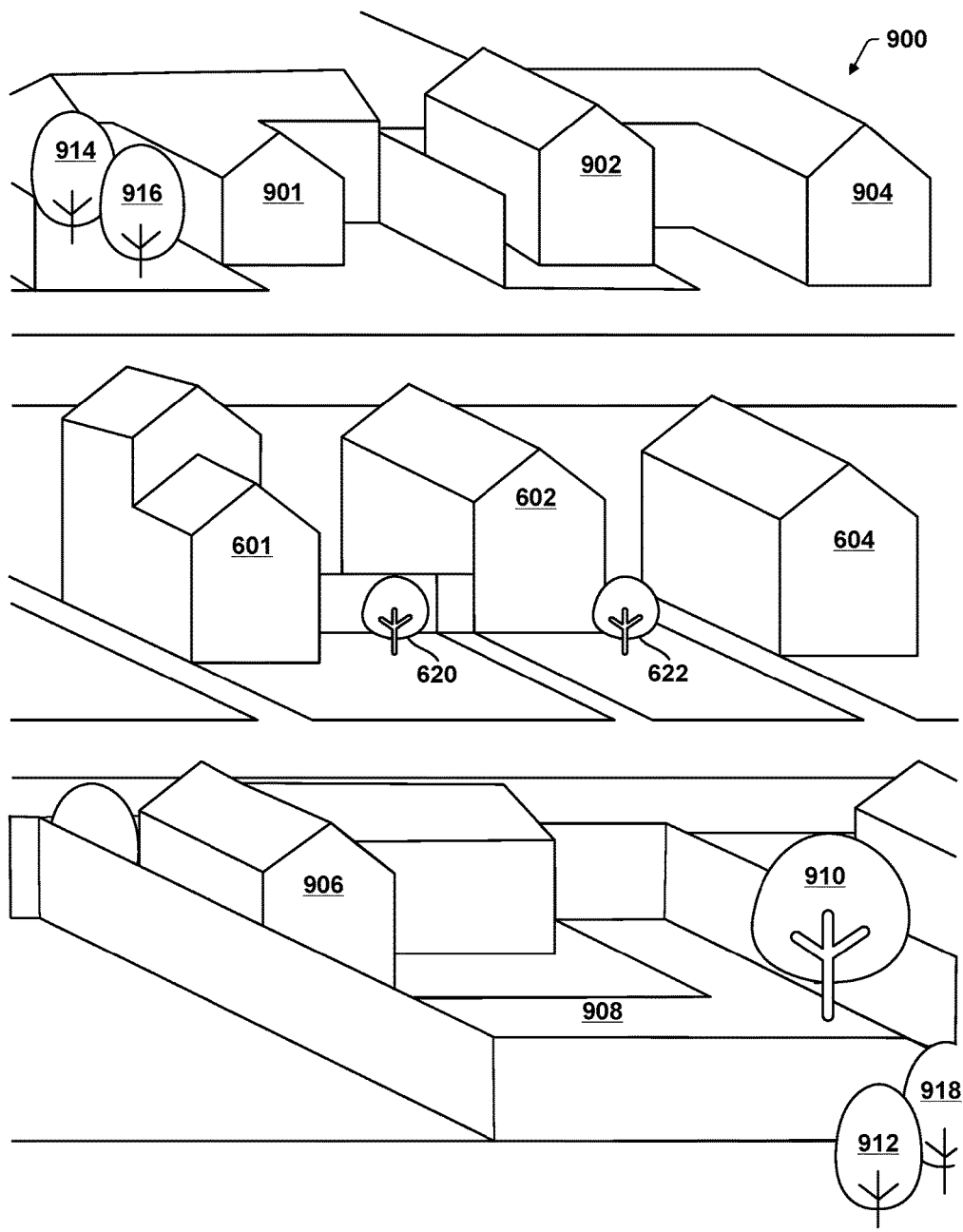
FIG. 9 illustrates an example virtual model, according to an example embodiment.

In some example embodiments, the mapping may be determined by comparing models 600 and 700, shown in FIGS. 6 and 7B, respectively, to a predetermined master model representing the geographical region of the delivery destination. FIG. 9 illustrates a portion of an example master model 900 representing the geographical region surrounding delivery destination 602 and including houses 601 and 604 as well as houses 901, 902, 904, and 906 that are not included in model 600. The master model 900 may be determined at a time prior to the delivery request for the object. For example, the master model 900 may be determined based on sensor data from one or more delivery vehicles operating in the geographical region of the delivery destination 602 while en route to other delivery destinations. In another example, master model 900 may be determined and updated based on previously-determined virtual models generated during prior object deliveries to locations within the geographic area and stored in a database (e.g., deliveries to houses 901, 902, 904, and 906. In a further example, master model 900 may be generated and updated based on image data from a mapping service that includes street-level images of geographic locations.

Master model 900 may be used to locate the delivery destination 602 and to localize the delivery vehicle within the general geographic vicinity of the delivery destination 602. In particular, after the first model 600 is generated, it may be compared or mapped to master model 900 to locate the first model 600 within master model 900. Additionally, the mapping of model 600 to master model 900 may be used to determine a position of the target drop-off spot 640 within master model 900.

Upon arriving within the general vicinity of delivery destination 602, the delivery vehicle may begin collecting sensor data based on which the second virtual model 700 may be generated. As the second model 700 is generated and updated, model 700 or a portion thereof may be compared or mapped to the master model 900 to determine the position and orientation of the delivery vehicle within the general geographic location of delivery destination 602 represented by model 900. The relative geographic positioning between models 600 and 700 may be determined based on their respective positions within master model 900. Thus, in some examples, models 600 and 700 might not be compared directly to one another. Instead, master model 900 may serve as an intermediary in determining the mapping between models 600 and 700.

The control system of the delivery vehicle may use master model 900 to determine a direction in which to move the delivery vehicle to find and scan delivery destination 602 and locate the target drop-off spot 640. Notably, by using master model 900, the control system may more quickly and accurately determine the direction in which to move to locate delivery destination 602 than if the control system had to estimate or predict the relative positioning of models 600 and 700 without master model 900. Model 900 may be particularly useful when the initial portions of model 700 do not overlap with model 600.

The delivery vehicle may be localized with respect to the delivery destination 602 based on distinct patterns of physical features within master model 900. For example, house 901 may include trees 914 and 916 planted to the left thereof, house 902/904 may form a U-shape, and house 906 may include a large fenced yard 908, tree 910, and shrubs 912 and 918. When, upon arrival within the general geographic vicinity of delivery destination 602, the delivery vehicle first collects sensor data indicative of house 906, the system may determine that to reach delivery destination 602, the delivery vehicle should proceed further north (i.e., up, along the page). Alternatively, when, upon arrival within the general geographic vicinity of delivery destination 602, the delivery vehicle first collects sensor data indicative of house 902/904, the system may determine that to reach delivery destination 602, the delivery vehicle should proceed south east (i.e., down and to the left along the page).

In some embodiments, the resolution of the second model may differ from that of the first model. For example, when the delivery vehicle approaches the delivery destination and begins collecting sensor data, the vehicle may be at a greater distance than the client computing device was at the time of capturing data for the first model. Accordingly, the second virtual model may be of a lower resolution than the first virtual model and may represent a much larger region of the delivery destination than the first model.

In one example, when an aerial UDV first begins to approach the general vicinity of the delivery destination 602, the UDV may be at a greater distance from the delivery destination than the client computing device was at the time of collecting data for the first virtual model. Accordingly, the sensor data received from the aerial UDV and the corresponding second model may represent a much greater geographic region than the first virtual model 600. For example, the second virtual model may represent the geographic area represented by master model 900. However, due to the distance between the aerial UDV and the delivery destination 602, the second model may be of a lower resolution than model 600.

Accordingly, the mapping operations may, based on the difference in resolution between the models and/or the difference in the size scale of the models, select an appropriate level of abstraction at which to determine the mapping. For example, when the models are of approximately the same resolution (e.g., as are models 600 and 700), most physical features may be compared between models. However, when the second model represents a larger geographic expanse than the first model and has a resolution lower than the first model, some smaller features such as, for example, windows, doors, and individual stairs might not be discernable in the second virtual model. Accordingly, the system may focus on mapping between larger features such as houses, roofs of houses, trees, and large vegetation, among other possibilities. For example, as the aerial UDV approaches delivery destination 602, the system may determine the mapping based on the estimated spacing between houses 601, 602, and 604, the shapes of the roofs of houses 601, 602, and 604, and the pattern of vegetation 620 and 622 relative to house 602. As the delivery vehicle gets closer to the delivery destination, smaller features may be sufficiently resolved within the second model to map these features to corresponding features in the first virtual model (e.g., the region around house 602 may be resolved to the level of details shown in model 700).

IX. Additional Example Implementations

In some example implementations, the systems and operations herein described may be adapted for use with existing delivery services relying on delivery people. In particular, a second client computing device associated with the delivery person may be used in place of the hardware of the delivery vehicle. The second client computing device may implement functionality to guide the delivery person to the target drop-off spot designated by the package recipient. After arriving at the delivery destination with the package, the delivery person may use the second client computing device to collect sensor data based on which the second model may be generated. Specifically, the second client computing device may display visual cues to guide the delivery person in scanning the delivery destination to generate the second model. The second model may be used in combination with the first model, as previously described, to locate the target drop-off spot within the second virtual model.

An indication of the target drop-off spot may be displayed by the second client computing device in the form of a virtual-reality marker to indicate to the delivery person where to place the package. For example, the second computing device may display a live video feed from the camera of the device (e.g., the screen of the second client computing device may function as a viewfinder) and, when the camera is panned over the target drop-off spot, a virtual marker may be displayed in the video feed indicating the target drop-off spot. Accordingly, the delivery person may place packages in safer and/or more convenient locations that have been predesignated by recipients.

Although the operations are described herein in the context of object drop-off at a target drop-off spot within a delivery destination, the operations may be equally adapted to object pick-up from a target pick-up spot within a pick-up location. Namely, the user of the client computing device may place an object for pickup at a target pick-up spot (e.g., a package the user wishes to return or exchange). The user may use the client computing device to collect sensor data based on which the first virtual model is generated. The user may additionally provide an indication of the target pick-up spot and the object placed therein by tapping, clicking, or otherwise selecting a representation of the object within the first virtual model or within the captured image data based on which the first virtual model is generated. The client computing device may also be programmed to allow the user to specify parameters such as the weight of the object and the delivery destination for the object.

An unmanned vehicle of appropriate size and range may be dispatched to pick up the object. The unmanned vehicle or a control system thereof may perform the operations herein described to locate the target pick-up spot, pick up the object, and deliver the object to the specified destination for the picked-up object. Accordingly, within examples, a delivery destination is herein defined to encompass a pick-up location, a target drop-off spot is herein defined to encompass a target pick-up spot, and placement of an object at the target drop-off spot is herein defined to encompass pick-up of the object from the target pick-up spot.

X. Conclusion

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

A block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as computer-readable media that stores data for short periods of time like register memory, processor cache, and random access memory (RAM). The computer readable media may also include non-transitory computer readable media that stores program code and/or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

Moreover, a block that represents one or more information transmissions may correspond to information transmissions between software and/or hardware modules in the same physical device. However, other information transmissions may be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A method comprising:
receiving, from a client computing device, an indication of a target drop-off spot for an object within a first virtual model of a first region of a delivery destination, the first virtual model indicating first physical features including three-dimensional relationships between objects in the first region of the delivery destination, the first virtual model being determined from multiple images captured by the client computing device and first sensor data corresponding to the multiple images;

receiving, from one or more sensors on a delivery vehicle, second sensor data indicative of a second region of the delivery destination;

determining, based on the second sensor data, a second virtual model of the second region of the delivery destination, the second virtual model indicating second physical features including three-dimensional relationships between objects in the second region of the delivery destination, the second virtual model being determined from the second sensor data captured by the delivery vehicle;

determining a mapping between one or more of the first physical features and one or more of the second physical features to determine an overlapping region between the first virtual model and the second virtual model;

based on the overlapping region, determining a position of the target drop-off spot within the second virtual model; and based on the position of the target drop-off spot within the second virtual model, providing instructions that cause the delivery vehicle to navigate to the target drop-off spot to place the object at the target drop-off spot.

2. The method of claim 1, further comprising:
providing instruction to display, by way of a user interface of the client computing device, the first virtual model;
providing instructions to prompt, by way of the user interface, for designation of the target drop-off spot for the object within the first virtual model; and
receiving, by way of the user interface, the designation of the target drop-off spot.

3. The method of claim 1, wherein the first sensor data is received at a first time and wherein the second sensor data is received at a second time later than the first time, wherein the second sensor data is captured from the one or more sensors of the delivery vehicle in response to the delivery vehicle being within a threshold distance of the delivery destination.

4. The method of claim 1, further comprising:
providing instruction to prompt, by way of a user interface of the client computing device, for selection of the delivery destination from a plurality of candidate delivery destinations for the object; and
providing instructions to prompt, by way of the user interface, for selection of the target drop-off spot from a plurality of user-designated candidate target drop-off spots for the object within the selected delivery destination.

5. The method of claim 1, wherein determining the second virtual model comprises:
determining, based on the second sensor data, an orientation of the second virtual model within the delivery destination.

6. The method of claim 1, wherein determining the second virtual model comprises:
determining, based on the second sensor data, a first portion of the second virtual model, the first portion indicating physical features of a first sub-region of the second region of the delivery destination;
determining that a confidence level of a mapping between the physical features indicated in the first portion of the second virtual model and the first physical features is below a threshold confidence value;
in response to determining that the confidence level of the mapping is below the threshold confidence value, receiving, from the one or more sensors on the delivery vehicle, additional sensor data indicative of a second sub-region of the second region of the delivery destination; and
determining, based on the additional sensor data, a second portion of the second virtual model, the second portion indicating physical features of the second sub-region of the second region of the delivery destination.

7. The method of claim 6, wherein determining a mapping between one or more of the first physical features and one or more of the second physical features comprises:
aligning the first virtual model with the second virtual model based on location of common objects identified in the first virtual model and the second virtual model;
determining a mapping between one or more of the first physical features and one or more of the physical features of the second sub-region to determine the overlapping region between the first virtual model and the second portion of the second virtual model; and
determining that a confidence level of the mapping between the one or more of the first physical features and the one or more of the physical features of the second sub-region is greater than the threshold confidence value.

8. The method of claim 1, wherein:
determining the mapping comprises:
determining a geometric transformation between representations of the one or more of the first physical features and representations of the one or more of the second physical features; and
determining a position of the target drop-off spot within the second virtual model comprises:
applying the determined geometric transformation to coordinates of the target drop-off spot within the first virtual model to determine coordinates of the target drop-off spot within the second virtual model.

9. The method of claim 1, wherein the overlapping region between the first virtual model and the second virtual model comprises a geometric intersection between a portion of the second virtual model and a corresponding portion of the first virtual model.

10. The method of claim 1, wherein the first virtual model is associated with global positioning system (GPS) coordinates, the method further comprising:
providing instructions to transport the object to the delivery destination by navigating the delivery vehicle from a facility storing the object to the delivery destination based on the GPS coordinates; and
after the delivery vehicle navigates to the delivery destination, receiving the second sensor data indicative of the second region of the delivery destination to locate the target drop-off spot within the delivery destination.

11. The method of claim 1, wherein the overlapping region does not contain the target drop-off spot, and wherein determining the position of the target drop-off spot within the second virtual model comprises:
based on the overlapping region, determining a path through which to move the delivery vehicle to collect additional sensor data indicative of a region of the delivery destination containing the target drop-off spot; and
providing instructions to navigate the delivery vehicle along the determined path and collect the additional sensor data while navigating along the determined path.

12. The method of claim 11, wherein determining the position of the target drop-off spot within the second virtual model additionally comprises:

updating the second virtual model based on the additional sensor data to represent the target drop-off spot and physical features of the region of the delivery destination containing the target drop-off spot.

13. The method of claim 1, further comprising:

receiving, from the one or more sensors on the delivery vehicle, image data representing the object disposed at the target drop-off spot; and transmitting, to the client computing device, a delivery confirmation including the image data representing the object disposed at the target drop-off spot.

14. The system of claim 13, wherein the one or more sensors comprise one or more of (i) global positioning system (GPS) module, (ii) a camera, or (iii) a magnetometer.

15. The method of claim 1, wherein the delivery vehicle is an autonomous delivery vehicle that navigates itself to the target drop-off spot in response to receiving the instructions.

16. The method of claim 1, wherein:

the first virtual model comprises a first three-dimensional model that indicates the three-dimensional relationships between the objects in the first region of the delivery destination;

the second virtual model comprises a second three-dimensional model that indicates the three-dimensional relationships between the objects in the second region of the delivery destination; and the first three-dimensional model and the second three-dimensional model each comprise one of (i) a point cloud, (ii) a wireframe model, (iii) a surface model, or (iv) a solid model.

17. The method of claim 1, further comprising determining the first virtual model from the multiple images and the first sensor data, including generating, in the first virtual model, a virtual representation of objects in the first region of the delivery destination using images of the objects and motion sensor data for each image of the object, the motion sensor data comprising at least one of global positioning system (GPS) data obtained from a GPS sensor of the client computing device when the image was captured or accelerometer data received from an accelerometer of the client computing device when the image was captured;

wherein generating the second virtual model comprises generating, in the second virtual model, a virtual representation of objects in the second region of the delivery destination using images of the objects captured by the delivery vehicle and motion sensor data for each image of the object, the motion sensor data comprising at least one of GPS data obtained from a GPS sensor of the delivery vehicle when the image was captured or accelerometer data received from an accelerometer of the delivery vehicle when the image was captured.

18. The method of claim 1, further comprising:

receiving, from the client computing device, global positioning system (GPS) coordinates of the client device;

determining, based on the GPS coordinates, second instructions that cause the delivery vehicle to navigate to within a threshold distance of the delivery destination;

providing the second instructions to the delivery vehicle; and determining that the delivery vehicle is within the threshold distance of the delivery destination, wherein the second virtual model is determined in response to determining that the delivery vehicle is within the threshold distance of the delivery destination.

19. A system comprising:

a delivery vehicle;

one or more sensors connected to the delivery vehicle; and a control system configured to:

receive, from a client computing device, an indication of a target drop-off spot for an object within a first virtual model of a first region of a delivery destination, the first virtual model indicating first physical features including three-dimensional relationships between objects in the first region of the delivery destination, the first virtual model being determined from multiple images captured by the client computing device and first sensor data corresponding to the multiple images;

receive, from the one or more sensors, second sensor data indicative of a second region of the delivery destination;

determine, based on the second sensor data, a second virtual model of the second region of the delivery destination, the second virtual model indicating second physical features including three-dimensional relationships between objects in the second region of the delivery destination, the second virtual model being determined from the second sensor data captured by the delivery vehicle;

determine a mapping between one or more of the first physical features and one or more of the second physical features to determine an overlapping region between the first virtual model and the second virtual model;

based on the overlapping region, determine a position of the target drop-off spot within the second virtual model; and based on the position of the target drop-off spot within the second virtual model, provide instructions that cause the delivery vehicle to navigate to the target drop-off spot to place the object at the target drop-off spot.

20. A non-transitory computer readable storage medium having stored thereon instructions that, when executed by a computing device, cause the computing device to perform operations comprising:

receiving, from a client computing device, an indication of a target drop-off spot for an object within a first virtual model of a first region of a delivery destination, the first virtual model indicating first physical features including three-dimensional relationships between objects in the first region of the delivery destination, the first virtual model being determined from multiple images captured by the client computing device and first sensor data corresponding to the multiple images;

receiving, from one or more sensors on a delivery vehicle, second sensor data indicative of a second region of the delivery destination;

determining, based on the second sensor data, a second virtual model of the second region of the delivery destination, the second virtual model indicating second physical features including three-dimensional relationships between objects in the second region of the delivery destination, the second virtual model being determined from the second sensor data captured by the delivery vehicle;

determining a mapping between one or more of the first physical features and one or more of the second physical features to determine an overlapping region between the first virtual model and the second virtual model;

based on the overlapping region, determining a position of the target drop-off spot within the second virtual model; and based on the position of the target drop-off spot within the second virtual model, providing instructions that cause the delivery vehicle to navigate to the target drop-off spot to place the object at the target drop-off spot.

* * * * *